US011901660B2

(12) United States Patent
Cohen et al.

(10) Patent No.: US 11,901,660 B2
(45) Date of Patent: *Feb. 13, 2024

(54) HIGH SPEED, HIGH DENSITY ELECTRICAL CONNECTOR

(71) Applicant: Amphenol Corporation, Wallingford, CT (US)

(72) Inventors: Thomas S. Cohen, New Boston, NH (US); Huilin Ren, Amherst, NH (US); Marc B. Cartier, Jr., Dover, NH (US); Trent K. Do, Nashua, NH (US); Mark W. Gailus, Concord, MA (US)

(73) Assignee: Amphenol Corporation, Wallingford, CT (US)

( * ) Notice: Subject to any disclaimer, the term of this patent is extended or adjusted under 35 U.S.C. 154(b) by 237 days.

This patent is subject to a terminal disclaimer.

(21) Appl. No.: 17/177,814

(22) Filed: Feb. 17, 2021

(65) Prior Publication Data

US 2021/0336363 A1 Oct. 28, 2021

Related U.S. Application Data

(60) Continuation of application No. 15/816,825, filed on Nov. 17, 2017, now Pat. No. 10,958,007, which is a (Continued)

(51) Int. Cl.
*H01R 13/04* (2006.01)
*H01R 13/6461* (2011.01)
(Continued)

(52) U.S. Cl.
CPC ......... *H01R 13/04* (2013.01); *H01R 13/6461* (2013.01); *H01R 13/6473* (2013.01); *H01R 13/6587* (2013.01)

(58) Field of Classification Search
CPC ................ H01R 13/04; H01R 13/6461; H01R 13/6473; H01R 13/6587; H01R 13/514;
(Continued)

(56) References Cited

U.S. PATENT DOCUMENTS 5,795,191 A 8/1998 Preputnick et al.
6,293,827 B1 9/2001 Stokoe
(Continued)

FOREIGN PATENT DOCUMENTS

CN 1502151 A 6/2004
CN 1515051 A 7/2004
(Continued)

OTHER PUBLICATIONS

English Translation of Search Report for Chinese Application No. 2012100490266, 8 pages.
(Continued)

*Primary Examiner* — Edwin A. Leon
(74) *Attorney, Agent, or Firm* — CANTOR COLBURN LLP

(57) ABSTRACT

A broadside coupled connector assembly has two sets of conductors, each separate planes. By providing the same path lengths, there is no skew between the conductors of the differential pair and the impedance of those conductors is identical. The conductor sets are formed by embedding the first set of conductors in an insulated housing having a top surface with channels. The second set of conductors is placed within the channels so that no air gaps form between the two sets of conductors. A second insulated housing is filled over the second set of conductors and into the channels to form a completed wafer. The ends of the conductors are received in a blade housing. Differential and ground pairs of blades have one end that extends through the bottom of the housing having a small footprint. An opposite end of the
(Continued)

pairs of blades diverge to connect with the wafers. The ends of the first and second sets of conductors and the blades are jogged in both an x- and y-coordinate to reduce crosstalk and improve electrical performance.

20 Claims, 19 Drawing Sheets

Related U.S. Application Data continuation of application No. 14/445,957, filed on Jul. 29, 2014, now Pat. No. 9,825,391, which is a division of application No. 13/354,783, filed on Jan. 20, 2012, now Pat. No. 8,814,595.

(60) Provisional application No. 61/449,509, filed on Mar. 4, 2011, provisional application No. 61/444,366, filed on Feb. 18, 2011.

(51) Int. Cl.
*H01R 13/6473* (2011.01)
*H01R 13/6587* (2011.01)

(58) Field of Classification Search
CPC .............. H01R 12/724; H01R 13/6471; H01R 12/585; H01R 13/6585; H01R 13/6477; H01R 12/716; H01R 12/737; H01R 13/518; H01R 23/688; H01R 13/6599; H01R 13/6586; H01R 43/16; H01R 12/52; H01R 12/712; H11R 12/727
See application file for complete search history.

(56) References Cited

U.S. PATENT DOCUMENTS 6,361,366 B1 * 3/2002 Shuey .................... H01R 12/00 439/607.07
6,409,543 B1 6/2002 Astbury, Jr. et al.
6,503,103 B1 1/2003 Cohen et al.
6,530,790 B1 3/2003 McNamara et al.
6,554,647 B1 4/2003 Cohen et al.
6,592,381 B2 7/2003 Cohen
6,602,095 B2 * 8/2003 Astbury, Jr. ....... H01R 13/6587 439/607.07
6,709,294 B1 3/2004 Cohen et al.
6,764,349 B2 7/2004 Provencher et al.
6,776,659 B1 8/2004 Stokoe et al.
6,786,771 B2 9/2004 Gallus
6,814,619 B1 11/2004 Stokoe et al.
6,939,173 B1 * 9/2005 Elco ..................... H01R 12/716 439/682
7,074,086 B2 7/2006 Cohen
7,094,102 B2 8/2006 Cohen et al.
7,108,556 B2 9/2006 Cohen et al.
7,163,421 B1 1/2007 Cohen et al.
7,320,621 B2 1/2008 Laurx et al.
7,322,856 B2 1/2008 Laurx et al.
7,335,063 B2 2/2008 Cohen et al.
7,371,117 B2 5/2008 Gallus
7,553,190 B2 6/2009 Laurx et al.
7,581,990 B2 9/2009 Kirk et al.
7,651,373 B2 * 1/2010 Knaub ............... H01R 13/6587 439/607.05
7,775,802 B2 8/2010 Defibaugh
7,794,240 B2 9/2010 Cohen et al.
7,794,278 B2 9/2010 Cohen et al.
7,811,129 B2 10/2010 Glover et al.
7,878,853 B2 2/2011 Amleshi et al.
7,914,303 B2 3/2011 Amleshi et al.
7,931,474 B2 4/2011 Laurx et al.
7,963,806 B1 6/2011 Scott Kline et al.
8,398,434 B2 3/2013 Davis et al.
8,469,745 B2 6/2013 Davis et al.
8,814,595 B2 * 8/2014 Cohen ................ H01R 13/6461 439/701
2010/0055933 A1 3/2010 Laurx et al.

FOREIGN PATENT DOCUMENTS

CN 101779334 A 7/2010
CN 201540983 U 8/2010
WO WO-9811633 A1 3/1998
WO WO-2006/105535 A1 10/2006

OTHER PUBLICATIONS

Translation of first Office Action for Chinese Patent Application No. 201610565530.X, dated Feb. 23, 2018, 6 pages.

* cited by examiner

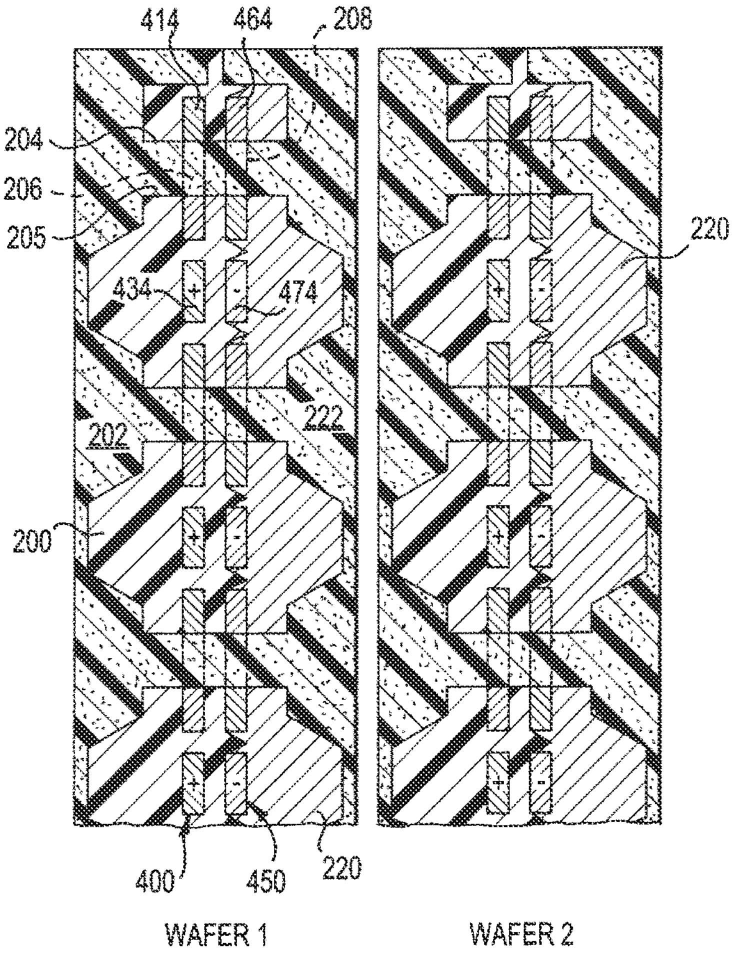
FIG. (6b)
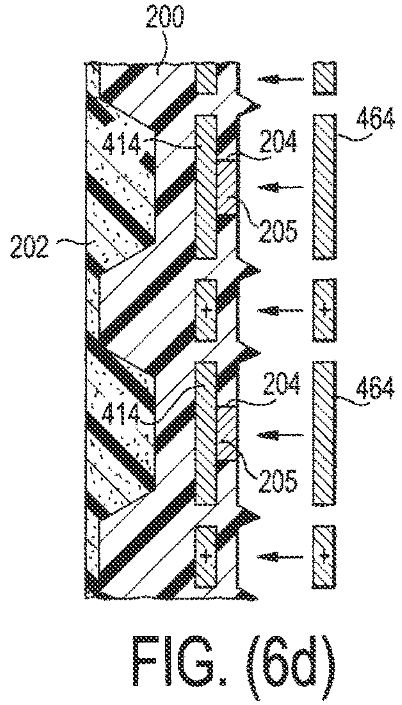
FIG. (6d)

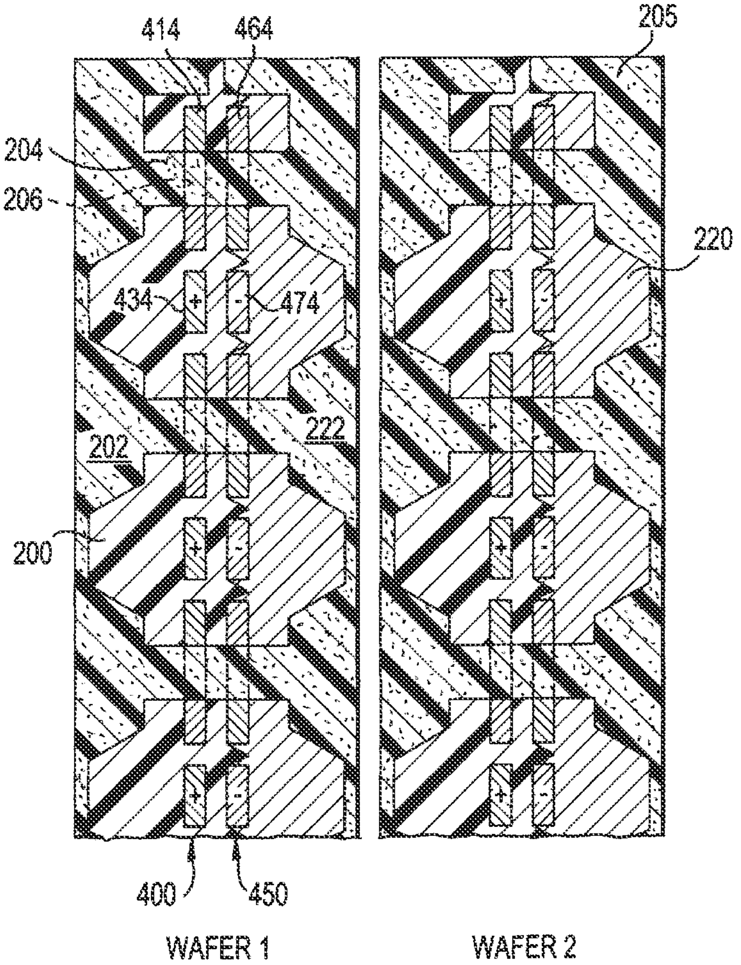
FIG. 6(c)
FIG. 15(b)
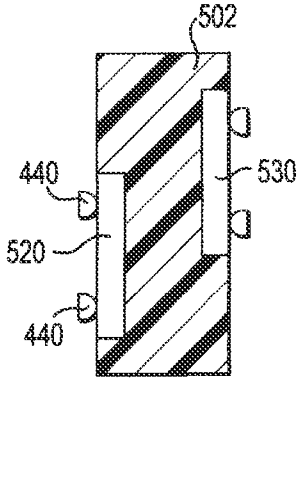

FIG. (8a)
(PRIOR ART)

HIGH SPEED, HIGH DENSITY ELECTRICAL CONNECTOR

RELATED APPLICATION

This application is a continuation of U.S. application Ser. No. 15/816,825, filed Nov. 17, 2017, which is a continuation of U.S. application Ser. No. 14/445,957, filed Jul. 29, 2014, which is a divisional of U.S. Pat. No. 8,814,595, filed Jan. 20, 2012, which claims the benefit of U.S. Prov. App. No. 61/444,366, filed Feb. 18, 2011 and U.S. Prov. App. No. 61/449,509, filed Mar. 4, 2011, the entire contents of which are incorporated herein by reference.

BACKGROUND OF THE INVENTION

1. Field of Invention

This invention relates generally to electrical interconnection systems and more specifically to improved signal integrity in interconnection systems, particularly in high speed electrical connectors.

2. Discussion of Related Art

Electrical connectors are used in many electronic systems. It is generally easier and more cost effective to manufacture a system on several printed circuit boards ("PCBs") that are connected to one another by electrical connectors than to manufacture a system as a single assembly. A traditional arrangement for interconnecting several PCBs is to have one PCB serve as a backplane. Other PCBs, which are called daughter boards or daughter cards, are then connected to the backplane by electrical connectors.

Electronic systems have generally become smaller, faster and functionally more complex. These changes mean that the number of circuits in a given area of an electronic system, along with the frequencies at which the circuits operate, have increased. Electrical connectors are needed that are electrically capable of handling more data at higher speeds. As signal frequencies increase, there is a greater possibility of electrical noise being generated in the connector, such as reflections, crosstalk and electromagnetic radiation. Therefore, the electrical connectors are designed to limit crosstalk between different signal paths and to control the characteristic impedance of each signal path.

Shield members can be placed adjacent the signal conductors for this purpose. Crosstalk between different signal paths through a connector can also be limited by arranging the various signal paths so that they are spaced further from each other and nearer to a shield, such as a grounded plate. In this way, the different signal paths tend to electromagnetically couple more to the shield and less with each other. For a given level of crosstalk, the signal paths can be placed closer together when sufficient electromagnetic coupling to the ground conductors is maintained. Shields for isolating conductors from one another are typically made from metal components. U.S. Pat. No. 6,709,294 (the '294 patent) describes making an extension of a shield plate in a connector made from a conductive plastic.

Other techniques may be used to control the performance of a connector. Transmitting signals differentially can also reduce crosstalk. Differential signals are carried on by a pair of conducting paths, called a "differential pair." The voltage difference between the conductive paths represents the signal. In general, a differential pair is designed with preferential coupling between the conducting paths of the pair. For example, the two conducting paths of a differential pair may be arranged to run closer to each other than to adjacent signal paths in the connector. No shielding is desired between the conducting paths of the pair, but shielding may be used between differential pairs. Electrical connectors can be designed for differential signals as well as for single-ended signals. Examples of differential electrical connectors are shown in U.S. Pat. Nos. 6,293,827, 6,503,103, 6,776,659, 7,163,421, and 7,581,990.

Electrical characteristics of a connector may also be controlled through the use of absorptive material. U.S. Pat. No. 6,786,771 describes the use of absorptive material to reduce unwanted resonances and improve connector performance, particularly at high speeds (for example, signal frequencies of 1 GHz or greater, particularly above 3 GHz). And, U.S. Pat. No. 7,371,117 describes the use of lossy material to improve connector performance. These patents are all hereby incorporated by reference.

SUMMARY OF THE INVENTION

Accordingly, it is an object of the invention to provide a broadside coupled connector assembly having two sets of conductors, each in a separate plane. It is a further object of the invention to provide a connector assembly having an improved connection at the mating interface between a daughter card connector and a backplane connector, with reduced insertion force and controlled higher normal mating force. It is a further object of the invention to provide a connector assembly having improved coupling at the mating interface to provide impedance matching and avoid undesirable electrical characteristics. It is a further object of the invention to provide a connector assembly which provides desirable electrical characteristics such as those achieved by a twin axial cable. These characteristics include good impedance control, balance of each differential pair including low in-pair skew and a high level of isolation between different pairs, while being suitable for large volume production such as by stamping and molding operations.

In accordance with these and other objects of the invention, a broadside coupled connector assembly is provided having two sets of conductors, each in a separate plane. The conductor sets are parallel to each other so that the ground conductors from each set align with each other to form ground pairs having the same path length. The signal conductors also align with each other to form differential signal pairs with the same path length. By providing the same path lengths, there is no skew between the conductors of the differential pair and the impedance of those conductors is identical.

The conductor sets are formed by embedding the first set of conductors in an insulated housing having a top surface with channels. The second set of conductors is placed within the channels so that no air gaps form between the two sets of conductors. A second insulated housing is filled over the second set of conductors and into the channels to form a completed wafer. The ends of the conductors are received in a blade housing. Differential and ground pairs of blades have one end that extends through the bottom of the housing having a small footprint. An opposite end of the pairs of blades diverges to connect with the wafers. The ends of the first and second sets of conductors and the blades are jogged in both an x- and y-coordinate to reduce crosstalk and improve electrical performance.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 1 is an exploded perspective view of the electrical interconnection system in accordance with a preferred embodiment of the invention;

FIG. 2 is a top view of first and second sets of conductors (wafer halves) on a carrier during assembly;

FIG. 3 is a detailed view of the mating region of the conductor wafer halves of FIG. 2;

FIG. 4 shows a first insulative housing formed around one of the conductor halves of FIG. 2;

FIG. 5 shows the carrier strip cut in half and the conductor half placed over the first insulative housing of the other conductor half;

FIG. 6(*a*) is a cross-section view of the intermediate portion of the wafer embedded in the first and second insulative housing with an additional outer lossy material housing;

FIG. 6(*b*) is an alternative embodiment to FIG. 6(*a*) with an opening extending through the ground conductor filled with lossy material formed integrally with the outer lossy housing to provide a conductive bridge;

FIG. 6(*c*) is an alternative embodiment with an opening extending through the ground conductor filled with the lossy conductive bridge formed in a separate process from one or both of the outer lossy housing halves;

FIG. 6(*d*) is an alternative embodiment with the lossy conductive bridge extending between the ground conductors of FIG. 6(*a*);

FIG. 7 is a perspective side view of the wafer with the insulative housings removed to better illustrate the first and second sets of conductors in the first preferred embodiment of the invention;

FIG. 8(*a*) is a prior art footprint pattern of plated holes of a printed circuit board arranged to receive contact ends for broadside coupled wafers;

FIG. 8(*b*) is a footprint pattern of holes arranged to receive first contact ends of the first and second sets of conductors in accordance with the present invention;

FIG. 8(*c*) is a footprint of plated holes of a printed circuit board arranged to receive contact ends for the first contact end vias with the signal vias moved closer to the ground vias in a given column to provide space for traces to be better routed;

FIG. 8(*d*) is a footprint pattern of FIG. 8(*c*) with the ground columns moved inward closer to one another to further increase space for the routing channel;

FIG. 9 is a front view of the wafer half of FIG. 4 with the first insulative housing;

FIG. 10 is a perspective view of the blades of the backplane connector of FIG. 1, with the insulative housing removed to better illustrate the arrangement of the blades;

FIG. 11 is a perspective view of the backplane connector of FIG. 1;

FIG. 12 is a cross-section of the backplane connector of FIG. 11 taken along line Y-Y of FIG. 11, mated with the daughtercard connector and illustrating the coupling of the ground contacts (of the daughter card connector) and the ground blades (of the backplane connector) in the mating region;

FIG. 13 is a cross-section of the backplane connector taken along line Z-Z of FIG. 11 mated with the daughtercard connector and illustrating the coupling of the signal contacts (of the daughter card connector) and the signal blades (of the backplane connector) in the mating region;

FIG. 14 is a top cross-sectional view of the backplane connector of FIGS. 1 and 11 mated with the daughtercard connector and showing the posts, contacts and blades in the mating region;

FIG. 15(*a*) is a top cross-sectional view of the backplane connector of FIG. 14 mated with the daughtercard connector and showing lossy material provided between the ground contacts of the wafers;

FIG. 15(*b*) is an alternative embodiment of the posts;

FIG. 16 is a perspective view of the wafer in the second preferred embodiment of the invention, with the insulative housing removed to better illustrate the configuration of the first and second sets of conductors;

FIG. 17(*a*) is a side view of the wafer pairs of FIG. 16, with the insulative housing removed to better illustrate the configuration of the first and second sets of conductors;

FIG. 17(*b*) is a front view of the wafer pairs of FIG. 16, showing the alignment of the pins and the mating contacts, with the insulative housing removed to better illustrate the configuration of the first and second sets of conductors;

FIG. 18 is a perspective view of the backplane connector in accordance with the second preferred embodiment;

FIG. 19 is a front view of the backplane connector of FIG. 18, with the housing removed to better illustrate the arrangement of the blades;

FIG. 20 is a bottom view of the blades of FIG. 19, with the housing removed to better illustrate the configuration of the pressfit ends;

FIG. 21 is a front view of the daughter card connectors coupled with the backplane connector, taken along line AA-AA of FIG. 18;

FIG. 22 is a cross-sectional view of the backplane connector of FIG. 18 mated with the daughtercard assembly including the daughtercard wafers and the front housing, at the mating interface; and FIG. 23 is a cross-sectional view of the backplane connector of FIG. 18 at the mating interface.

DETAILED DESCRIPTION OF THE PREFERRED EMBODIMENTS

Figure 1:
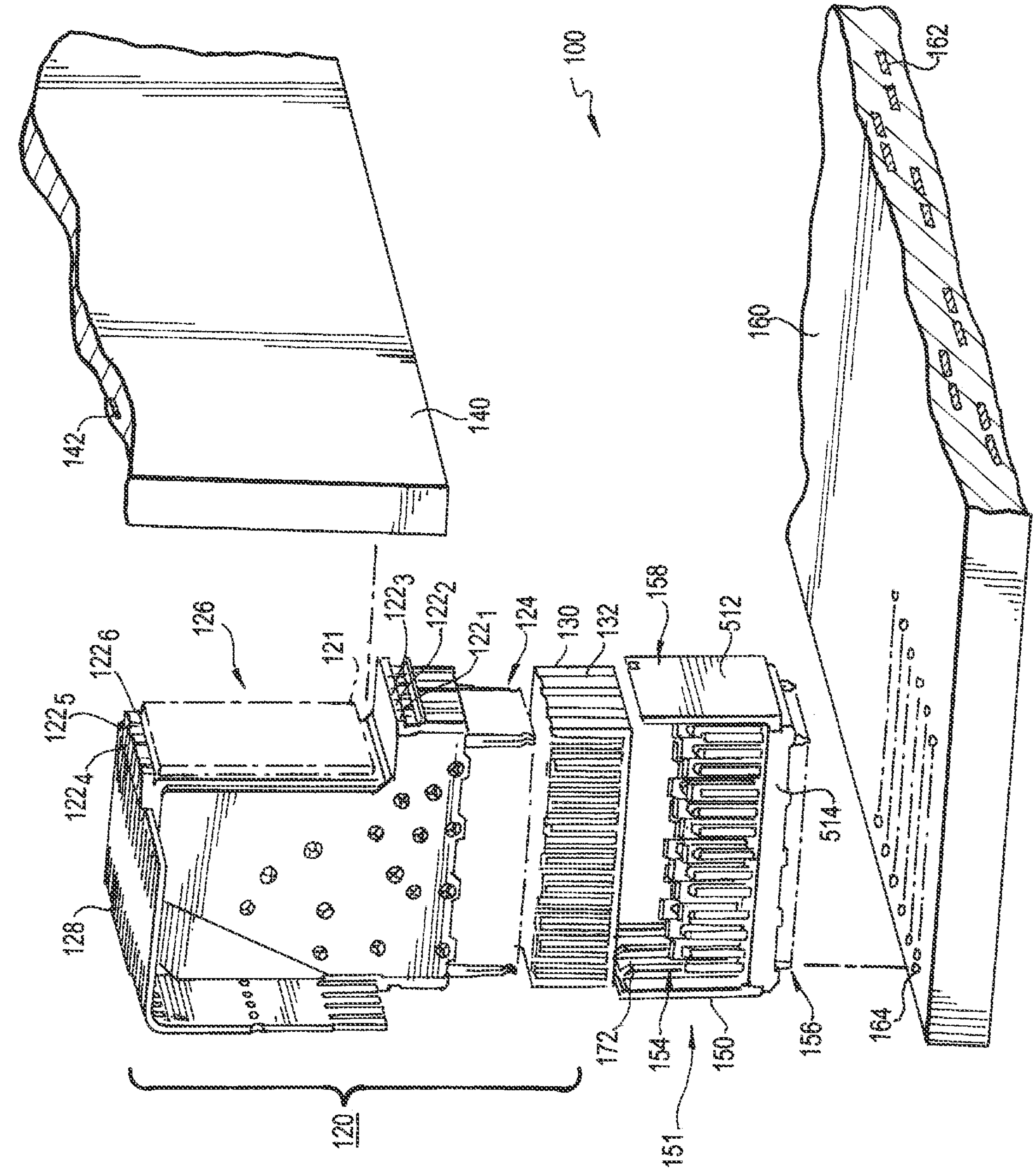
FIGS. 1, 4-5, 8 show the connector used in accordance with either of a first or second preferred embodiments of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose.

Turning to the drawings, FIG. 1 shows an electrical interconnection system 100 with two connectors, namely a daughter card connector 120 and a backplane connector 150. The daughter card connector 120 is designed to mate with the backplane connector 150, creating electronically conducting paths between the backplane 160 and the daughter card 140. Though not expressly shown, the interconnection system 100 may interconnect multiple daughter cards having similar daughter card connectors that mate to similar backplane connections on the backplane 160. Accordingly, the number and type of subassemblies connected through an interconnection system is not a limitation on the invention. FIG. 1 shows an interconnection system using a right-angle, backplane connector. It should be appreciated that in other embodiments, the electrical interconnection system 100 may include other types and combinations of connectors, as the invention may be broadly applied in many types of electrical connectors, such as right angle connectors, mezzanine connectors, card edge connectors, cable-to-board connectors, and chip sockets.

The backplane connector 150 and the daughter card connector 120 each contain conductive elements 151, 121. The conductive elements 121 of the daughter card connector 120 are coupled to traces 142, ground planes or other conductive elements within the daughter card 140. The traces carry electrical signals and the ground planes provide reference levels for components on the daughter card 140. Ground planes may have voltages that are at earth ground or positive or negative with respect to earth ground, as any voltage level may act as a reference level.

Similarly, conductive elements 151 in the backplane connector 150 are coupled to traces 162, ground planes or other conductive elements within the backplane 160. When the daughter card connector 120 and the backplane connector 150 mate, conductive elements in the two connectors are connected to complete electrically conductive paths between the conductive elements within the backplane 160 and the daughter card 140.

The backplane connector 150 includes a backplane shroud 158 and a plurality conductive elements 151. The conductive elements 151 of the backplane connector 150 extend through the floor 514 of the backplane shroud 158 with portions both above and below the floor 514. Here, the portions of the conductive elements that extend above the floor 514 form mating contacts, shown collectively as mating contact portions 154, which are adapted to mate to corresponding conductive elements of the daughter card connector 120. In the illustrated embodiment, the mating contacts 154 are in the form of blades, although other suitable contact configurations may be employed, as the present invention is not limited in this regard.

Tail portions, shown collectively as contact tails 156, of the conductive elements 151 extend below the shroud floor 514 and are adapted to be attached to the backplane 160. Here, the tail portions 156 are in the form of a press fit, "eye of the needle" compliant sections that fit within via holes, shown collectively as via holes 164, on the backplane 160. However, other configurations are also suitable, such as surface mount elements, spring contacts, solderable pins, pressure-mount contacts, paste-in-hole solder attachment.

In the embodiment illustrated, the backplane shroud 158 is molded from a dielectric material such as plastic or nylon. Examples of suitable materials are liquid crystal polymer (LCP), polyphenyline sulfide (PPS), high temperature nylon or polypropylene (PPO). Other suitable materials may be employed, as the present invention is not limited in this regard. All of these are suitable for use as binder materials in manufacturing connectors according to the invention. One or more fillers may be included in some or all of the binder material used to form the backplane shroud 158 to control the electrical or mechanical properties of the backplane shroud 150. For example, thermoplastic PPS filled to 30% by volume with glass fiber may be used to form the shroud 158.

The backplane connector 150 is manufactured by molding the backplane shroud 158 with openings to receive the conductive elements 151. The conductive elements 151 may be shaped with barbs or other retention features that hold the conductive elements 151 in place when inserted in the opening of the backplane shroud 158. The backplane shroud 158 further includes side walls 512 that extend along the length of opposing sides of the backplane shroud 158. The side walls 512 include ribs 172, which run vertically along an inner surface of the side walls 512. The ribs 172 serve to guide the front housing 130 of the daughter card connector 120 via mating projections 132 into the appropriate position in the shroud 158.

Figure 2:
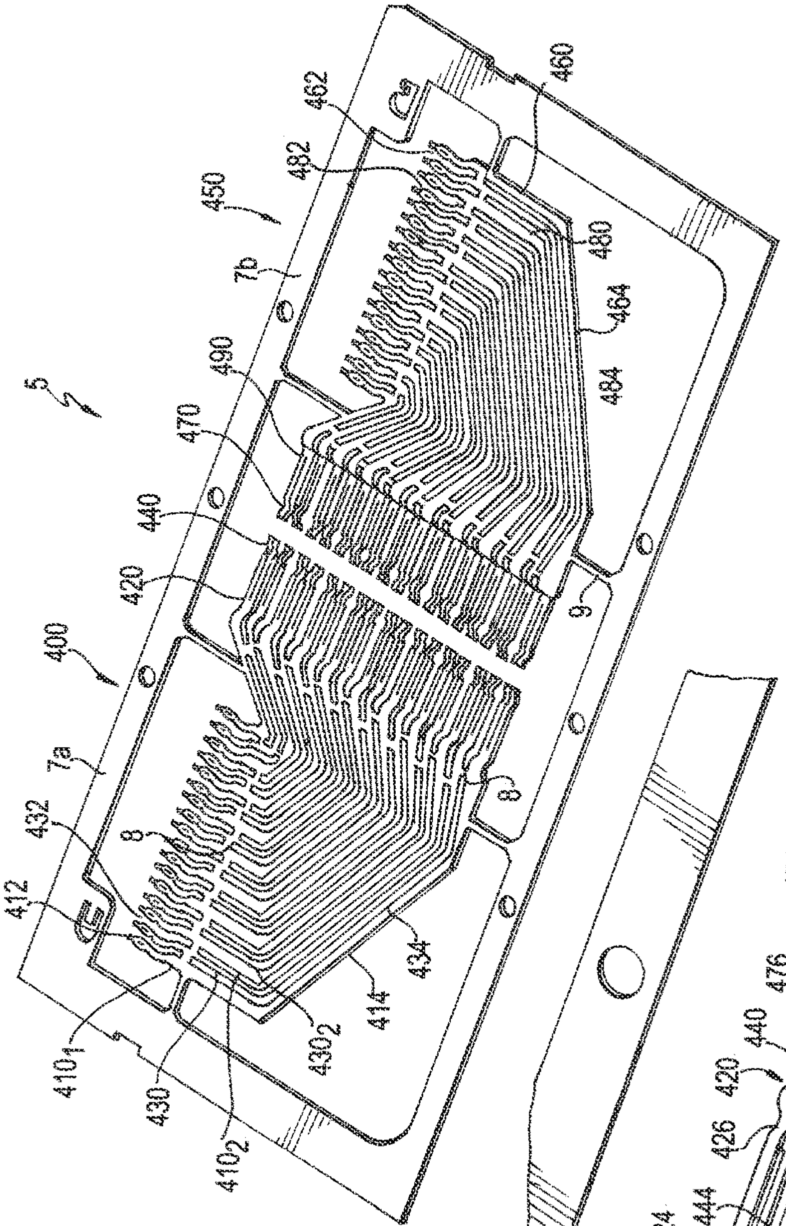
FIGS. 2-3, 6-7, 9-15 show the connector in accordance with the first preferred embodiment of the invention.

The daughter card connector 120 includes a plurality of wafers $\mathbf{122}_1 \ldots \mathbf{122}_6$ coupled together. Each of the plurality of wafers $\mathbf{122}_1 \ldots \mathbf{122}_6$ has a housing 200 (FIG. 4) and at least one column of conductive elements 121. Each column of conductive elements 121 comprises a plurality of signal conductors 430, 480 and a plurality of ground conductors 410, 460 (FIG. 2). The ground conductors may be employed within each wafer $\mathbf{122}_1 \ldots \mathbf{122}_6$ to minimize crosstalk between the signal conductors or to otherwise control the electrical properties of the connector. As with the shroud 158 of the backplane connector 150, the housing 200 (FIG. 4) may be formed of any suitable material and may include portions that have conductive filler or are otherwise made lossy. The daughter card connector 120 is a right angle connector and the conductive elements 121 traverse a right angle. As a result, opposing ends of the conductive elements 121 extend from perpendicular edges of the wafers $\mathbf{122}_1 \ldots \mathbf{122}_6$.

Each conductive element 121 of the wafers $\mathbf{122}_1 \ldots \mathbf{122}_6$ has at least one contact tail 126 that can be connected to the daughter card 140. Each conductive element 121 in the daughter card connector 120 also has a mating contact portion 124 which can be connected to a corresponding conductive element 151 in the backplane connector 150. Each conductive element also has an intermediate portion between the mating contact portion 124 and the contact tail 126, which may be enclosed by or embedded within a wafer housing 200.

The contact tails 126 electrically connect the conductive elements within the daughter card and the connector 120 to conductive elements, such as the traces 142 in the daughter card 140. In the embodiment illustrated, the contact tails 126 are press fit "eye of the needle" contacts that make an electrical connection through via holes in the daughter card 140. However, any suitable attachment mechanism may be used instead of or in addition to via holes and press fit contact tails, such as pressure-mount contacts, paste-in-hole solder attachments.

In the illustrated embodiment, each of the mating contacts 124 has a dual beam structure configured to mate to a corresponding mating contact 154 of backplane connector 150. The dual beam provides redundancy and reliability in the event there is an obstruction such as dirt, or one of the beams does not otherwise have a reliable connection. The conductive elements acting as signal conductors may be grouped in pairs, separated by ground conductors in a configuration suitable for use as a differential electrical connector.

However, embodiments are possible for single-ended use in which the conductive elements are evenly spaced without designated ground conductors separating signal conductors or with a ground conductor between each signal conductor.

In the embodiments illustrated, some conductive elements are designated as forming a differential pair of conductors and some conductive elements are designated as ground conductors. These designations refer to the intended use of the conductive elements in an interconnection system as they would be understood by one of skill in the art. For example, though other uses of the conductive elements may be possible, differential pairs may be identified based on preferential coupling between the conductive elements that make up the pair. Electrical characteristics of the pair, such as its characteristic impedance, that make it suitable for carrying a differential signal may provide an alternative or additional method of identifying a differential pair. As another example, in a connector with differential pairs, ground conductors may be identified by their positioning relative to the differential pairs. In other instances, ground conductors may be identified by their shape or electrical characteristics. For example, ground conductors may be relatively wide to provide low inductance, which is desirable for providing a stable reference potential, but provides an impedance that is undesirable for carrying a high speed signal.

For exemplary purposes only, the daughter card connector 120 is illustrated with six wafers $\mathbf{122}_1 \ldots \mathbf{122}_6$, with each wafer having a plurality of pairs of signal conductors and adjacent ground conductors. As pictured, each of the wafers $\mathbf{122}_1 \ldots \mathbf{122}_6$ includes one column of conductive elements. However, the present invention is not limited in this regard, as the number of wafers and the number of signal conductors and ground conductors in each wafer may be varied as desired.

As shown, each wafer $\mathbf{122}_1 \ldots \mathbf{122}_6$ is inserted into the front housing 130 such that the mating contacts 124 are inserted into and held within openings in the front housing 130. The openings in the front housing 130 are positioned so as to allow the mating contacts 154 of the backplane connector 150 to enter the openings in front housing 130 and allow electrical connection with mating contacts 124 when the daughter card connector 120 is mated to the backplane connector 150.

The daughter card connector 120 may include a support member instead of or in addition to the front housing 130 to hold the wafers $\mathbf{122}_1 \ldots \mathbf{122}_6$. In the pictured embodiment, the stiffener 128 supports the plurality of wafers $\mathbf{122}_1 \ldots \mathbf{122}_6$. The stiffener 128 is a stamped metal member, though the stiffener 128 may be formed from any suitable material. The stiffener 128 may be stamped with slots, holes, grooves or other features that can engage a wafer. Each wafer $\mathbf{122}_1 \ldots \mathbf{122}_6$ may include attachment features that engage the stiffener 128 to locate each wafer 122 with respect to another and further to prevent rotation of the wafer 122. Of course, the present invention is not limited in this regard, and no stiffener need be employed. Further, although the stiffener is shown attached to an upper and side portion of the plurality of wafers, the present invention is not limited in this respect, as other suitable locations may be employed.

FIGS. 2-6 illustrate the process for forming the wafers 122 with the conductors 121 and the housing 200. The electrical interconnection system 100 provides high speed board-to-board connectors or board-to-cable connectors having differential signal pairs. Starting with FIG. 2, a lead frame 5 is provided having a carrier 7 with two lead frame section halves 7*a*, 7*b*. The wafers 122 are constructed from a first set of conductors forming a first conductor half 400 and a second set of conductors forming a second conductor half 450, which are stamped from a same metal sheet. The sets of conductors 400, 450 are attached to the carrier 7 by thin carrier tie bars 9 and in selected places by internal tie bars 8.

The first set of conductors 400 has a plurality of conductors arranged in a first plane. The first set of conductors 400 include both ground conductors 410 and signal conductors 430. The conductors 400 have different lengths and are arranged substantially parallel to one another in somewhat of a concentric fashion. Each of the ground conductors 410 and signal conductors 430 has a contact tail or first contact end 412, 432 which connects to a printed circuit board, a mating portion or second contact end 420, 440 which connects to another electrical connector, and an intermediate portion 414, 434, therebetween. The first contact end 412, 432 extends in a direction that is substantially orthogonal to the second contact end 420, 440, so that the conductors 400 connect with boards or connectors 140, 160 that are orthogonal to one another, as shown in FIG. 1.

The first set of conductors 400 is configured with an outermost conductor being a ground conductor $\mathbf{410}_1$, followed by a signal conductor $\mathbf{430}_1$, which are the longest conductors in the first set of conductors 400, which get shorter as they go inward (i.e., to the top right in the figure). The ground conductors 410 have a wider intermediate portion 414 than the signal conductors 430. The intermediate portions 414, 434 of the first set of conductors 400 are an exact mirror image of the intermediate portions 464, 484 of the second set of conductors 450. However, as will be discussed further below, the first and second contact ends 412, 432, 420, 440 of the first set of conductors 400 differ in alignment and/or configuration from the first and second contact ends 462, 482, 470, 490 of the second set of conductors 450.

Figure 3:
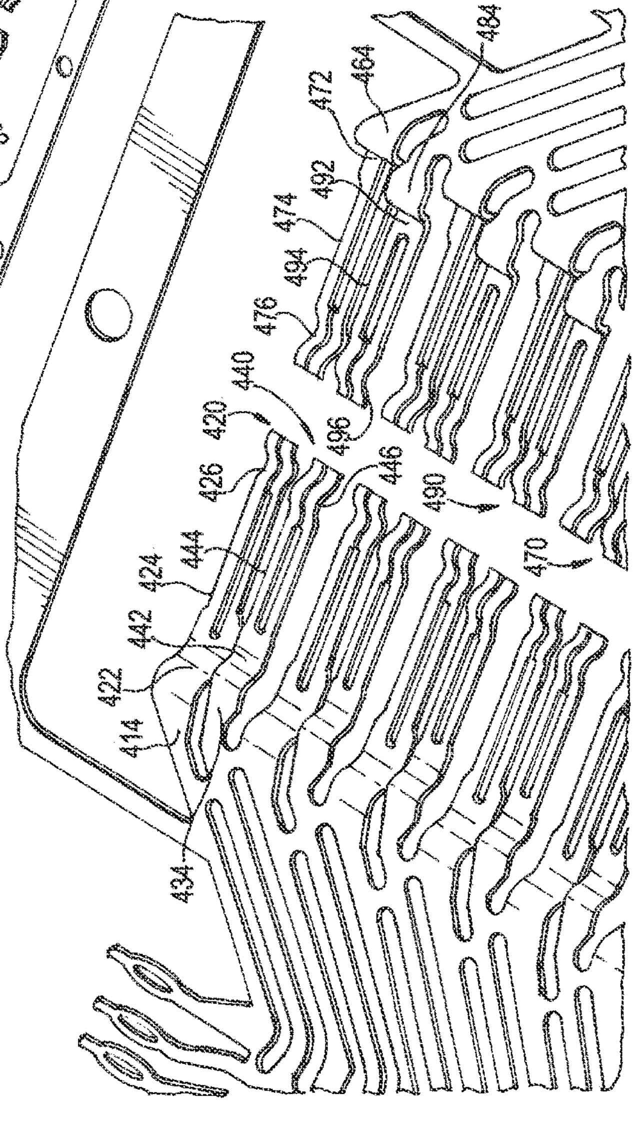

As best shown in FIG. 3, each of the second contact ends 420, 440 has a bend portion 422, 442 and dual beams 424, 444 with a concave contact portion 426, 446. The bends 422, 442 project outward with respect to the intermediate portion 414, 434 when the conductors 400, 450 are finally arranged. The second contact ends 420, 440 are arranged so that the contact portions 426, 446 of the ground conductors 410 face in one direction and the contact portions 426, 446 of the signal conductors 430 face in an opposite direction. In the embodiment shown in FIG. 3, the contact portions 426 of the ground conductor 410 face downward (i.e., into the page), while the contact portions 446 of the signal conductor 430 face upward (i.e., out of the page).

Returning to FIG. 2, the second set of conductors 450 has a plurality of conductors arranged in a first plane. The second set of conductors 450 include both ground conductors 460 and signal conductors 480. The conductors 450 have different lengths and are arranged substantially parallel to one another in somewhat of a concentric fashion. Each of the conductors 460, 480 has a contact tail or first contact end 462, 482 which connects to a printed circuit board, a mating portion or second contact end 470, 490 which connects to another electrical connector, and an intermediate portion 464, 484, therebetween. The first contact end 462, 482 extends in a direction that is substantially orthogonal to the second contact end 470, 490, so that the conductors 450 connect with boards or connectors 140, 160 that are orthogonal to one another, as shown in FIG. 1.

Referring again to FIG. 3, each of the second contact ends 470, 490 has a bend portion 472, 492 and dual beams 474, 494 with a concave contact portion 476, 496. The bends 472, 492 project outward with respect to the intermediate portion 464, 484 when the conductors 400, 450 are finally arranged. The second contact ends 470, 490 are arranged so that the contact portions 476, 496 of the ground conductors 460 face in one direction and the contact portions 476, 496 of the signal conductors 480 face in an opposite direction. In the embodiment shown in FIG. 3, the contact portions 476 of the ground conductor 460 face downward (i.e., into the page), while the contact portions 496 of the signal conductor 480 face upward (i.e., out of the page). While FIG. 3 shows the second contact ends 470, 490 adapted for a particular type of connection to a circuit board, they may take any suitable form (e.g., press-fit contacts, pressure-mount contacts, paste-in-hole solder attachment) for connecting to a printed circuit board.

Figure 4:
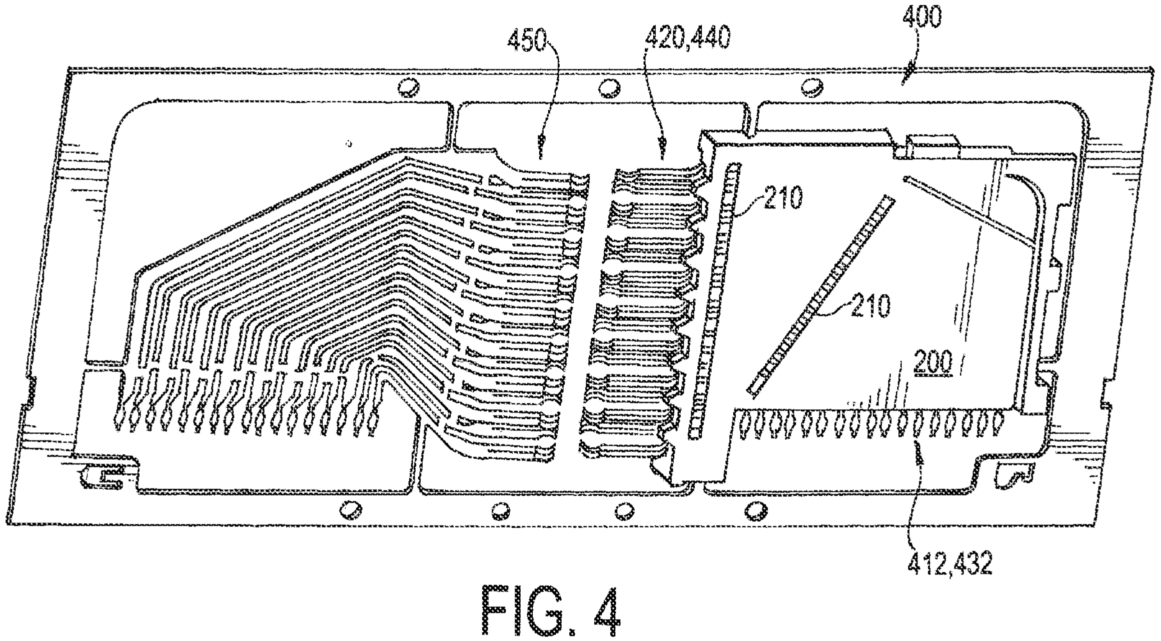

Turning to FIG. 4, the next step in the assembly of the wafer 122 is shown. Here, the first set of conductors 400 is over molded to form a first insulated housing portion 200. Preferably, the first insulated housing portion 200 is formed around the conductors 400 by injection molding plastic over at least a portion of the intermediate portions 414, 434, while substantially leaving the first contact ends 412, 432 and the second contact ends 420, 440 exposed. To facilitate this process, the positions of the conductors 400 are maintained connected to the lead frame carrier 7 by the carrier tie bars 9, as well as by the internal tie bars 8.

The first insulated housing portion 200 may optionally be provided with windows 210. These windows 210 ensure that the conductors 200 are properly positioned during the injection molding process. They allow pinch bars or pinch pins to hold the conductors in place at the middle of the conductors as the first housing is over molded. In addition, the windows 210 provide impedance control to achieve desired impedance characteristics, and facilitate insertion of materials which have electrical properties different than the insulated housing portion 200. After the first insulated housing 200 is formed, the internal tie bars 8 are severed, since the insulated housing 200 holds those conductors 400 in place.

Figure 5:
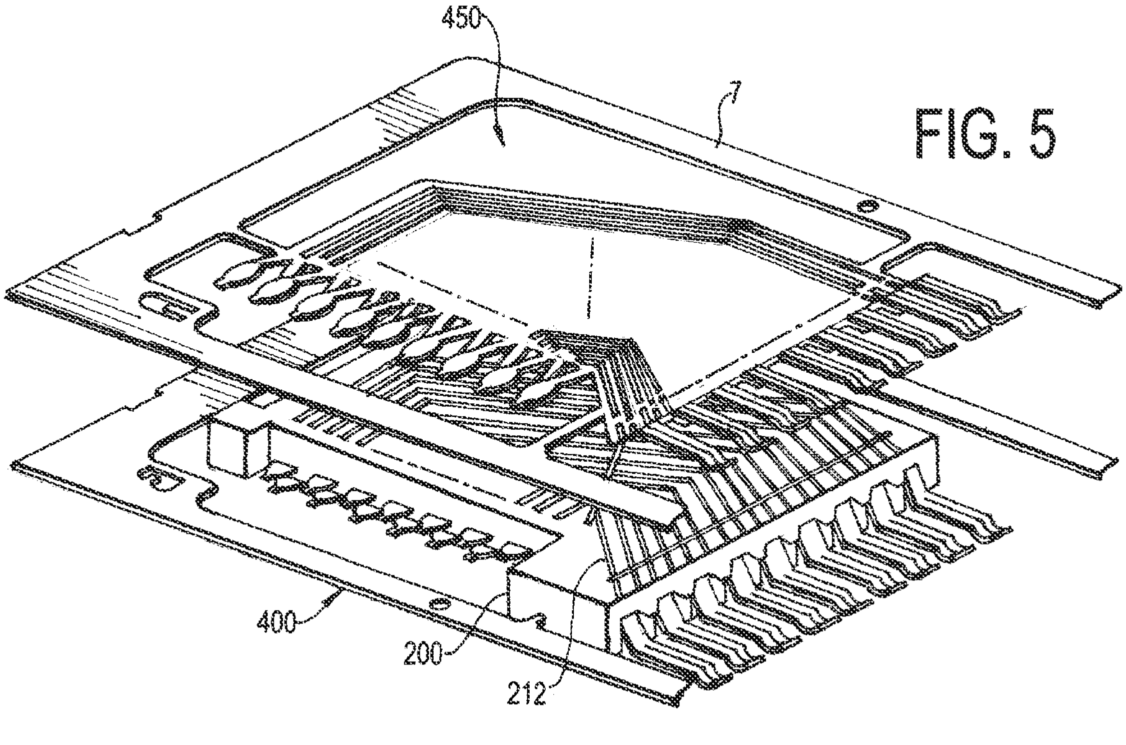

Once the first insulated housing 200 is formed, the frame carrier 7 is cut so that the first and second sets of conductors 400, 450 are separated. The second set of conductors 450 is then set upon the first insulative housing 200, as shown in FIG. 5. Accordingly, the first conductors 410, 420 are aligned with the second conductors 470, 490 in a side-by-side or horizontal relationship. This side-by-side relationship forms a coupling between the broad sides of the conductors to provide a greater coupling between the signal conductors of the differential pair as well as between ground conductors, and is known as broadside coupling. The broadside coupling also provides a symmetry and electrical balance in the differential signal pairs to be electrically equal.

Figure 6A:
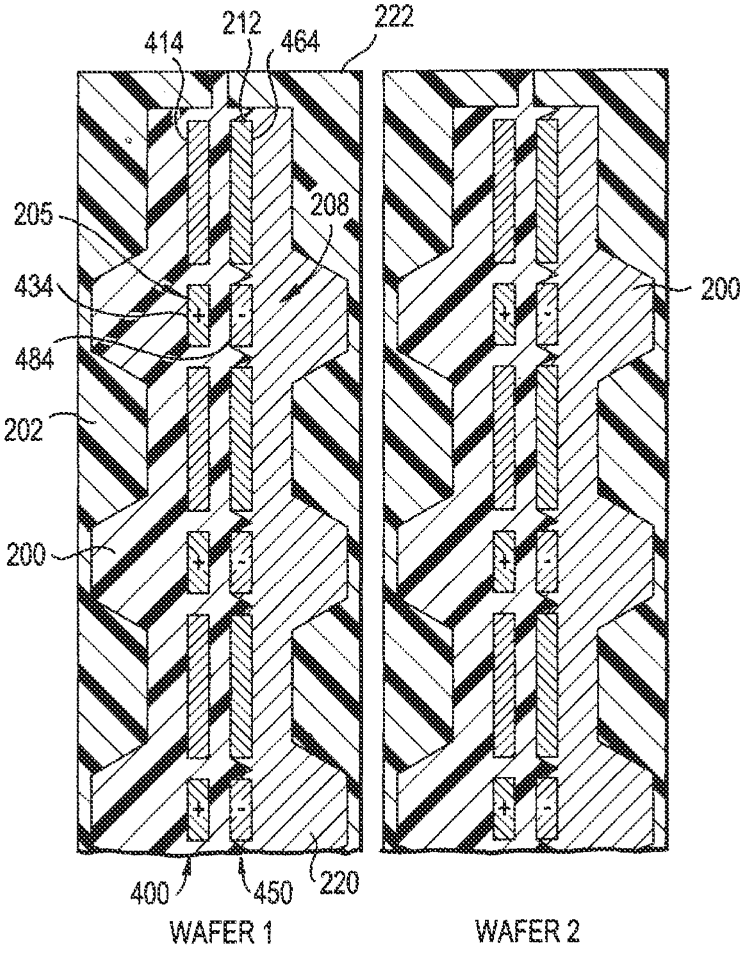

As shown in FIG. 6(*a*), when the insulated housing 200 is molded over the intermediate portions 414, 434 of the first set of conductors 400, indentations or channels 212 are formed on the inner surface of the insulated housing 200. The intermediate portions 464, 484 of the second set of conductors 450 are then placed in the channels 212. The outer sections of the frame carrier 7 can be aligned with each other to facilitate the alignment of the first and second sets of conductors 400, 450, so that the second set of conductors 450 can be positioned in the channels 212. The intermediate portions 464, 484 of the conductors 450 can then be pushed into the channels 212 until the conductors 450 seat completely into the bottoms of the channels 212. Thus, the conductors 450 are flush with the bottoms of the channels 212, as shown. The side walls of the channels 212 can be angled inwardly to direct the intermediate portions 464, 484 of the second conductors 450 to the bottom of the channel 212 and into alignment with the intermediate portions 414, 434 of the first conductors 400. The bottom of the channel provides a snug fit for the second conductors 450 to prevent lateral movement of the conductors 450 in the channel 212.

Once the second conductors 450 are positioned within the channels 212, a second insulative housing 220 is then molded over the second set of conductors 450. The second insulative housing 220 bonds to the first insulative housing

200, and fixes the second set of conductors 450 in the channels 212. As in the molding of the first insulative housing 200, the molding of the second insulative housing 220 may be accomplished by any one of several processes, such as injection molding, using the lead frame carrier 7 to properly position the second set of conductors 450 to be molded. The molding tolerance is within the impedance specification tolerance for the leads. In one embodiment, such a tolerance may be +/− one thousandths of an inch. The second conductors 450 (which are flat in the intermediate portions 464, 484) are flush with the flat bottom of the channel 212, so that no air gap is introduced between the second conductors 450 and the first insulative housing 200. At this point, the internal tie bars 8 of the second conductors 450 are cut since the second insulative housing 220 will hold those conductors 450 in place.

By having a two-step insert molding process, the first set of conductors 400 can be fixed in place, and then the second set of conductors 450 is fixed in place. This allows the second set of conductors 450 to be more easily positioned since the first set of conductors need not be separately held in place. That is, when the second set of conductors 450 is being insert molded, the first set of conductors 400 need not be separately held in position (since those conductors 400 are held in position by the first housing 200). Rather, the second set of conductors 450 only needs to be held in position with respect to the first insulative housing 200. The first insert molding 200 helps hold the second set of conductors 450 in position during the second molding operation. And, the first and second sets of conductors 400, 450 can be held in position by using the carrier 7 when creating each of the insulative housings 200, 220.

Metal pins or the like can be used in combination with the channels 212, to control the separation of the first lead frame 400 and the second lead frame 450. For instance, pinch pins can maintain the second set of conductors 450 in the channels 212, and the channels 212 maintain the second set of conductors 450 at the desired distance from the first set of conductors 400. This allows for more accurate and better positioning of the first and second conductors 400, 450 with respect to one another. On advantage of this is that it eliminates the need for pinch pins having to pass through or by the first set of conductors 400 to hold the second set of conductors 450 during the overmold process. This allows the intermediate portions of the lead frames to be identical mirror images of one another and permit the lead frames to be fixed at a desired distance from one another during the molding process, which produces a perfectly balanced differential pair.

It is noted that FIG. 4 shows the carrier running horizontally. However, the carrier can also extend vertically. An advantage of having separate carrier strips for conductors 400, 450 is that the unmolded conductor halve 450 can be placed onto the conductor halve 400 in a continuous process with both of the conductors 400, 450 held on a carrier strip. The same assembly method can be accomplished by running carrier strips horizontally or vertically or by having separate carrier strips for lead frames 400, 450. Another option is to have multiple copies of the conductor halves 400 or 450 on a lead frame.

Referring to FIG. 6(*a*), the outer surfaces of the first and second insulative housings 200, 220 can be provided with channels aligned with the intermediate portions 414, 464 of the ground conductors. The outer housing layers 202, 222 are applied, by insert molding or being affixed, over the first and second insulative housings 200, 220, respectively. The outer layers 202, 222 enter the external channels on the outer surface of the first and second insulative housings 200, 220, so that the outer layers 202, 222 are closer to the respective ground conductors 414, 464 and further from the signal conductors, 434, 484. The outer layers 202, 222 are preferably a lossy layer. By being closer to the ground conductor intermediate portions 414, 464, or even contacting the ground conductors 414, 464, the outer lossy layers 202, 222 prevent undesired resonance between the ground conductors of one wafer and the ground conductors of the neighboring wafer. That is because the ground conductors form a stronger coupling to the outer lossy layers 202, 222 than to the ground conductors of the neighboring wafer. That also dampens undesired resonance between the ground conductors of one wafer half with the ground conductors of the mating wafer half.

In addition, by being further from the signal conductors, the outer lossy layer 222 does not introduce undesirable signal loss or attenuation. It should be appreciated, however, that the outer layers 202, 222 need not be separate layers which are comprised of a lossy material; but rather can be an insulative material which is formed integral with the insulative housings 200, 220, respectively. The outer layers 202, 222 can also be a one-piece member, rather than two separate pieces as shown. Still further, the lossy layers 202, 222 need not be provided over the entire wafer, but can be at certain selected areas such as over the straight sections of the conductors at areas X, Y and/or Z shown in FIG. 7. Accordingly, the lossy layers 202, 222 can only cover a portion of the intermediate portions 414, 434, 464, 484 of the conductors.

More specifically, FIG. 6(*a*) provides a cross-sectional view of the resulting structure of the insulative housing with the previously formed first insulated housing 200 and the overmolded section forming the second insulated housing 220. This configuration forms the wafer 122 of FIG. 1. Referring to FIG. 6(*a*), the impedance between the conductors 400, 450 separated by the first insulative housing 200, is set by the distance separating the conductors 400, 450 and the predetermined distance is maintained by the overmolding process. Thus, the channels 212 define the distance between the first set of conductors 400 and the second set of conductors 450 to control the impedance between the first conductors 400 and the second conductors 450. In addition, the channels 212 align the first contact ends 412, 432 of the first set of conductors 400 with the respective first contact ends 462, 482 of the second set of conductors 450, without touching. And, the second contact ends 420, 440 of the first set of conductors 400 are aligned with but do not touch the respective second contact ends 470, 490 of the second set of conductors 450.

Figure 7:
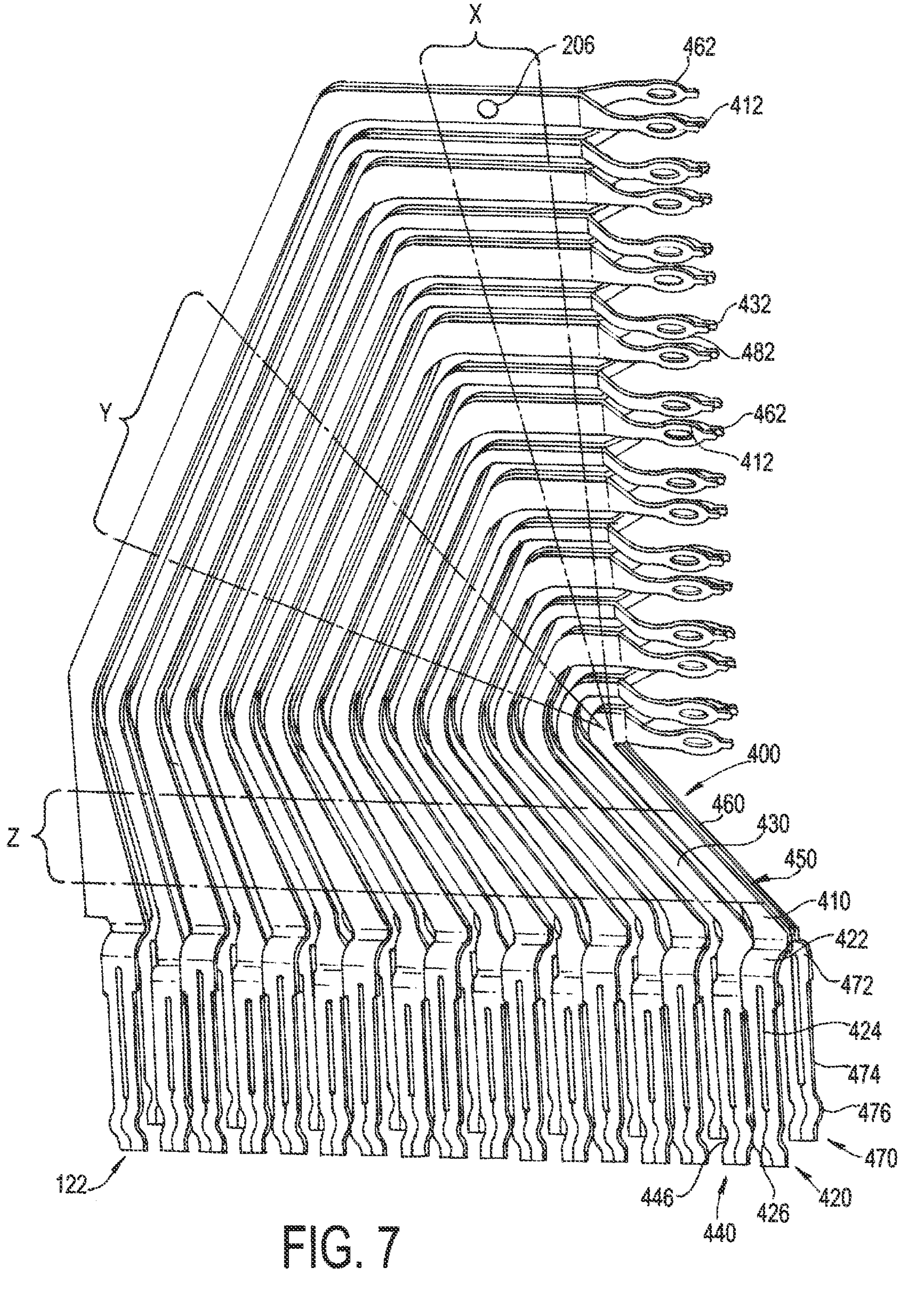

Turning to FIG. 6(*b*), an alternative embodiment of the invention is shown. Here, through-holes 204 are located through each of the pairs of ground conductors 414, 464 and the respective housings 200, 220. The connector is assembled by providing or creating openings 206, 208 (FIG. 6(*c*)) in the ground conductors 414, 464, such as by stamping. One opening 206 is shown in FIG. 7 for illustrative purposes. The first insulative housing 200 is then insert molded about the first set of conductors 400. The through-hole 204 is formed in the insulative housing 200 during that molding process, such as by forming the first housing 200 about pins placed over both sides of the opening 206 in the ground conductors 414. The pins prevent the housing 200 from entering the opening 206 in the ground conductor 414, and are removed after the first housing 200 is formed. The pins are typically wider than the respective openings 206 to prevent insulative plastic from filling the opening 206. Accordingly, the conductors 414, 464 may extend slightly into the through-hole.

The first insulative housing 200 is also formed with the channels 212 located at the inner surface thereof. The second set of conductors 450 are placed in the channels 212 and the second insulative housing 220 is formed over the top of the first insulative housing 200 and the second conductors 450. The through-hole 204 is formed in the second housing 220 during its molding process, such as by the use of a pin placed over the opening 208. The housing 200, 220 can be recessed back from the edge of the conductors 414, 464 at the opening 208 to provide more surface contact between the lossy material and the conductor.

Accordingly, pins are placed over the opening 206 in the first ground conductors 414 as the first insulative housing 200 is overmolded. The pins are slightly larger than the opening 206 to prevent the insulative material from entering the opening 206. This forms a small step or lip whereby the ground conductors 414 project inward slightly from the inner surface of the insulative housing 202 about the opening 206. Once the insulative housing 200 is set, the second conductors 450 are placed in the channels 212. The second ground conductors 464 have respective openings 208. Accordingly, pins are placed over the openings 208 as the second insulative housing 200 is formed. Those pins are slightly larger than the openings 208 to prevent the insulative material from entering those openings 208. This forms a small step or lip whereby the ground conductors 464 project inward slightly from the inner surface of the insulative housing 220 about the opening 208.

In this manner, the through-holes 204 pass all the way through at least the first and second housings 200, 220, as well as the first and second ground conductors 414, 464. A lossy material can be placed in the through-holes 204, such as by an insert molding process or during assembly of the outer housing 202, 222, to form a bridge 205. The lossy material further controls the resonances between the first ground conductors 414 and the second ground conductors 464 by damping such resonances and/or electrically commoning the ground conductors together. The bridge 205 can be formed integrally with the outer housings 202, 222, as shown in FIG. 6(*b*). Or, the bridge 205 can be formed independently prior to the molding of the outer housings 202, 222 (if any), as shown in FIG. 6(*c*).

Turning to FIG. 6(*d*), another embodiment of the invention is shown. FIG. 6(*d*) is similar to FIG. 6(*a*), in that openings are not formed in the ground conductors 414, 464. However, during the molding of the first insulative housing 200, pins or other elements are placed over a central portion of the ground conductors 414 to create a through-hole 204. That through-hole 204 is filled with a conductive lossy material to form the bridge 205 between the two ground conductors 414, 464. The second conductors 450 are then placed in the channels 212 and the second insulative housing 220 can then be formed.

In each of FIGS. 6(*b*)-(*d*), the bridge 205 is conductive to electrically connect the first ground conductors 414 with the second ground conductors 464. This commons the ground conductors 414, 464 with respect to one another and dampens resonances. It is noted that the bridge 205 need not be in direct contact with the ground conductors 414, 464. If a lossy material is used for the bridge 205, the lossy material can be capacitively coupled with the ground conductors 414, 464 by being in proximity to those ground conductors 414, 464. It is further noted that the through-holes 204 and openings 206, 208 can be any suitable shape, such as circular, oval, or rectangular. And, the bridge 205 need not be symmetrical, but can be wider in certain parts to provide a desired resonance control.

The first and second insulative housings 200, 220 can be made of several types of materials. The housings 200, 220 may be made of a thermoplastic or other suitable binder material such that it can be molded around the conductors 400, 450. The outer layers 202, 222, on the other hand, can be made of a thermoplastic or other suitable binder material. Those layers 202, 222 may contain fillers or particles to provide the housing with desirable electromagnetic properties. The fillers or particles make the housing "electrically lossy," which generally refers to materials that conduct, but with some loss, over the frequency range of interest. Electrically lossy materials can be formed, for instance, from lossy dielectric and/or lossy conductive materials and/or lossy ferromagnetic materials. The frequency range of interest depends on the operating parameters of the system in which such a connector is used, but will generally be between about 1 GHz and 25 GHz, though higher frequencies or lower frequencies may be of interest in some applications.

Electrically lossy material can be formed from materials that may traditionally be regarded as dielectric materials, such as those that have an electric loss tangent greater than approximately 0.1 in the frequency range of interest. The "electric loss tangent" is the ratio of the imaginary part to the real part of the complex electrical permittivity of the material. Examples of materials that may be used are those that have an electric loss tangent between approximately 0.04 and 0.2 over a frequency range of interest.

Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity over the frequency range of interest.

In some embodiments, electrically lossy material is formed by adding a filler that contains conductive particles to a binder. Examples of conductive particles that may be used as a filler to form electrically lossy materials include carbon or graphite formed as fibers, flakes or other particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure or can otherwise be used to position the filler material.

In some embodiments, the binder may be a thermoplastic material such as is traditionally used in the manufacture of electrical connectors to facilitate the molding of the electrically lossy material into the desired shapes and locations as part of the manufacture of the electrical connector. However, many alternative forms of binder materials may be used. Curable materials, such as epoxies, can serve as a binder. Alternatively, materials such as thermosetting resins or adhesives may be used. Also, while the above described binder material are used to create an electrically lossy material by forming a binder around conducting particle fillers, the invention is not so limited. For example, conducting particles may be impregnated into a formed matrix material. As used herein, the term "binder" encompasses a material that encapsulates the filler or is impregnated with the filler.

The lossy material removes the resonance which can otherwise occur between ground structures in a broadside coupled horizontal paired connectors where the grounds are independent and separate. The lossy material is positioned along some portion of the length of the connector paths, and is preferably a conductively loaded plastic such as carbon filled plastic or the like. The lossy material is spaced away from the signal conductors, but spaced relatively closer to or in contact with the ground conductors. So that actually prevents them from resonating with a low loss Hi-Q resonance that would interfere with the proper performance of the connector.

Referring to FIG. 7, the final alignment of the first and second sets of conductors 400, 450 is shown, with the insulative housings 200, 220 removed for ease of illustration and the first set of conductors 400 positioned in front of the second set of conductors 450. As shown, each of the ground conductors 410 of the first set of conductors 400 is aligned with and substantially parallel with a respective one of the ground conductors 460 of the second set of conductors 450. And, each of the signal conductors 430 of the first set of conductors 400 is aligned with and is substantially parallel to a respective one of the signal conductors 480 of the second set of conductors 450.

The intermediate portions of the first conductors 400 are in a first plane that is closely spaced with and parallel to the intermediate portions of the second conductors 450 in a second plane. Accordingly, the respective signal conductors 430, 480 which face each other, form signal pairs. One of the signal conductors 430 in each of the signal pairs has a positive signal, and the other signal conductor 480 in the signal pair has a negative signal, so that the signal pair forms a differential signal pair. The signal conductors 430, 480 alternate with the ground conductors 410, 460 in each of the sets of conductors 400, 450, so that the differential signal pairs alternate with the ground pairs, as perhaps best shown in FIG. 6(*a*). Likewise, the first contact ends 412, 432, 462, 482 and the second contact ends 420, 440, 470, 490 are also formed into ground and differential signal pairs which alternate with one another. Those contact ends also have bends in the x, y and/or z direction so that the pins align in desired configurations.

The differential signal pairs and the ground pairs are formed by utilizing one of the conductors in the first set of conductors 400, and one of the conductors of the second set of conductors 450. Thus, as shown in FIG. 7, the conductors of each of the differential signal pairs and the ground pairs each have the exact same length so that there is no differential delay or skew between those conductors. By eliminating that skew, balance in the differential signal path is maintained, and mode conversion between differential and common modes is minimized.

With this configuration of the intermediate portion, a high quality of differential signal matching and shielding is achieved by two primary means. First, the mirror image of the broadside coupled configuration provides a virtual ground plane through the center of symmetry of each pair. Secondly, a pair of physical ground conductors in the same lead frame is located adjacent to each signal pair half (i.e., the ground conductors above and below the signal conductor in region X in the embodiment of FIG. 7). This serves as a physical ground current return path. This physical ground return path provides further shielding and impedance control for both differential and common mode components of the signal. The impedance of the differential pairs is determined by the width and cross-sectional shape of the signal conductors, the spacing between the plus and minus signal conductors, and the spacing between each signal and the adjacent grounds. And, the impedance goes down if insulating material with a high dielectric constant is provided between the signal conductors (a lower dielectric constant causes the impedance to increase).

The physical ground conductors alternating with the signal conductors in each of the two lead frame halves, provides a physical ground return that reduces common mode noise effects and electromagnetic interference due to the small amounts of common mode currents typically present on each differential pair. The present invention also avoids having to manufacture a separate ground shield component while providing good differential mode performance and good common mode performance. And, the present invention allows the user to adjust the differential impedance between the positive and negative signal conductors 430, 470 of a differential pair over a wide range. For instance, by moving the signal conductors of a differential signal pair 430, 480 further apart from each other, the differential impedance is increased. If the signal conductors of a differential signal pair 430, 480 are moved closer together, the differential impedance between them is decreased. And still further, the common mode impedance can be adjusted over a wide range by changing the distance between the signal conductors 430, 480 and the ground conductors.

The present arrangement provides a substantially horizontally coupled board-to-board connector. Thus, the conductors 400, 450 are symmetric and parallel, especially at the intermediate portion. The lead frames are symmetrical and have horizontal pairs where a certain signal row in the first set of conductors 400 and a respective signal row in the second set of conductors 450 form a horizontal pair. Ground conductors are located between the pairs in each wafer half. The conductors 400, 450 are flat and wider in cross section in the plane of the stamped metal plates than in the thickness. Accordingly, the first set of signal conductors 430 couple with the second set of signal conductors 480 along that flat or broad side. That is, the first signal conductors 430 are broadside coupled with the second signal conductors 480, such that the wide side of the signal conductors 430, 480 face each other. The polarity of those conductors are reversed, so that the first signal conductors 430 form differential signal pairs with a respective one of the second signal conductors 480. For instance, the first signal conductors 430 can all be positive, and the second signal conductors 480 can all be negative, or vice versa. Or, the first signal conductors 430 can be alternating positive and negative and the aligning second signal conductors 480 can be alternating negative and positive.

Figure 8C:
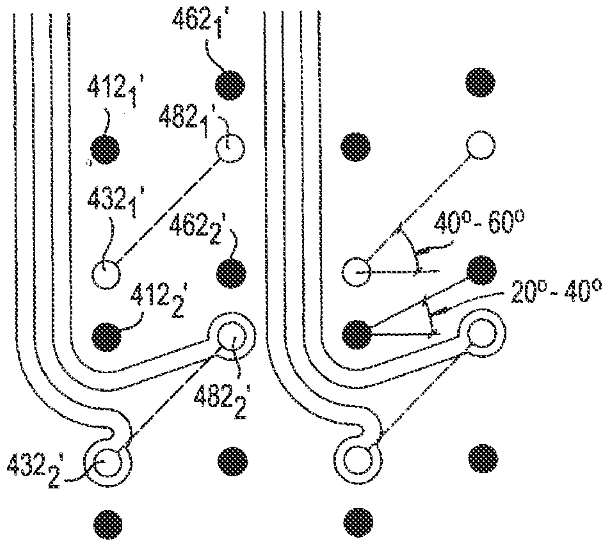
Figure 8D:
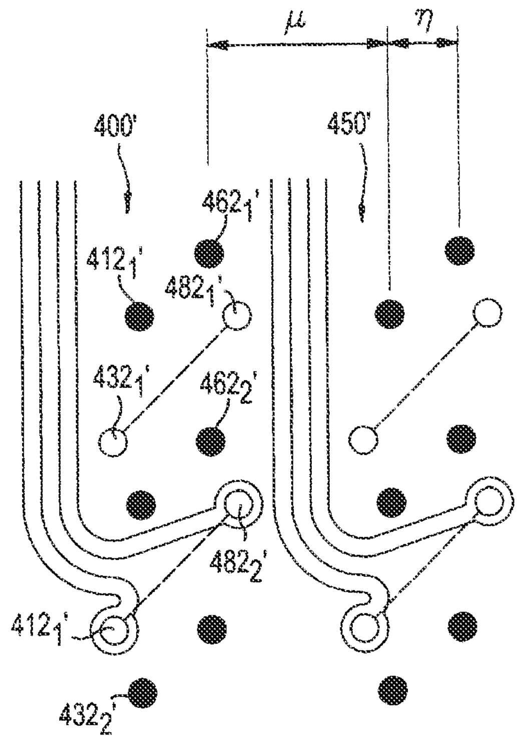

Referring to FIG. 8(*a*), a conventional footprint pattern arrangement of plated holes of a printed circuit board arranged to receive contact ends that connect to the daughter card 140 for a broadside coupled connector 120 is shown. Here, the ground pins (dark circles) are aligned in rows, and the signal pins (hollow circles) are aligned in rows. The rows form respective columns. The rows of ground and signal pins alternate with one another, so that there is a ground pin on either side of each signal pin in each column, and the adjacent rows are uniformly separated by a distance C. A first wafer 10 is spaced from a neighboring second wafer 12 by a distance which is greater than the distance between columns within each wafer. Accordingly, the distance A between columns in each wafer 10, 12 is smaller than the distance B from a pin in the first wafer 10 to the adjacent pin in the second wafer 12. However, constraints over the size of the press fit holes and the pins (and to minimize the distance between them) limit the movement of the vias so the left-hand pair cannot be moved sufficiently away from the right-hand pairs to reduce crosstalk between the wafer pairs 10, 12 and to provide a channel for routing the traces between the wafers 10, 12. In addition, if the distance A is too small, the impedance becomes too low, whereas increasing the distance A raises the impedance, which is frequently desirable.

FIG. 8(*b*) shows one non-limiting illustration of the preferred embodiment of the invention, having an improved arrangement of plated via holes 412', 432', 462', 482' which receive the respective contact pins 412, 432, 462, 482 that connect to a daughter card 140. With respect to FIGS. 8(*a*)-(*c*), it should be noted that although the figures show the plated via holes 412', 432', 462', 482' of a printed circuit board, those positions and locations also represent the positions and locations of the corresponding contact pins 412, 432, 462, 482 of the conductors 400, 450. Thus, the discussion of position and/or location applies to both the holes 412', 432', 462', 482', as well as the respective pins 412, 432, 462, 482 that mate with those holes. So, the discussion of pins 412, 432, 462, 482 applies to the discussion of the respective holes 412', 432', 462', 482', and vice versa. It is also further noted that the holes 412', 432', 462', 482' can receive the pins 412, 432, 462, 482, or the pins can connect to the holes through an adapter or the like. So, while the positions and/or locations are preferably those of the pins of the connector, they can also represent the pins of the adapter.

Here, the adjacent columns of pins within a single wafer $\mathbf{122}_1$, $\mathbf{122}_2$, are offset with respect to one another. Accordingly, the wafers $\mathbf{122}_1$, $\mathbf{122}_2$ have a top row with a single ground pin $\mathbf{462}_1$ and hole $\mathbf{462}_1'$ in the second column, a second row formed by a ground pin $\mathbf{412}_1$ and hole $\mathbf{412}_1'$ and a signal pin $\mathbf{482}_1$ and hole $\mathbf{482}_1'$, a third row formed by a signal pin $\mathbf{432}_1$ and hole $\mathbf{432}_1'$ and a ground pin $\mathbf{462}_2$ and hole $\mathbf{462}_2'$, a fourth row with a ground pin $\mathbf{412}_2$ and hole $\mathbf{412}_2'$ and a signal pin $\mathbf{482}_2$ and hole $\mathbf{482}_2'$, and so on, with a final row having a single ground pin $\mathbf{412}_n$ and hole $\mathbf{412}_n'$ in the first column. Thus, the press fit contacts 412, 432, 462, 482 and holes 412', 432', 462', 482' are jogged in and out of the plane and also up and down (FIG. 7). They are wider horizontally (center to center) and are jogged vertically to create the plated through hole via pattern shown in FIG. 8(*b*). The distances F, G, H between the adjacent rows need not change (and can be the same as the distance C, for instance), so that the vertical pair-to-pair spacing substantially remains the same. Each signal pin 432, 482 is surrounded by up to four ground pins, which reduces crosstalk. The distance I between the signal pins 482 and the signal pins 432 of the adjacent wafer (e.g., the distance from $\mathbf{482}_2$ to $\mathbf{432}_1$) is substantially larger, further reducing crosstalk. This allows the distance E to be made smaller than the distance B, thereby providing an interconnect system with higher interconnect density (i.e., greater number of pairs in a given space). The increased density is achieved while at the same time that the distance K between signal pins $\mathbf{432}_1$, $\mathbf{482}_1$ in a differential pair is greater than the distance A, which helps avoid too low of a differential impedance in the footprint.

By jogging the pins 412, 432, 462, 482 and holes 412', 432', 462', 482', the present invention achieves better density at the printed circuit board. This also results in lower crosstalk between the pairs at the attachment to the board and the via pattern. Shifting to the diagonal pairs provides much better isolation and effective shielding of the differential pairs to reduce crosstalk. Not only in the press fit pins, but in the plated through holes and the board or backplane that they go into. Another advantage of this configuration is that the wafers $122_1$ and $122_2$ are identical, while advantageously providing a staggering of signal and ground conductors at the interface between the wafers. So, only one wafer configuration need be manufactured, and yet obtain the advantages of the configuration of FIG. 8(*b*).

The impedance of each differential pair is controlled by the diameter of the conductor, the K spacing between the plus/minus halves, the D spacing horizontally to a nearby ground, the H and G spacing to the ground above and below and the distance E spacing to the one to the right. But, the distances G and H can be controlled independent of one another, and don't have to be the same as each other. Accordingly, the impedance of a pair can be raised by spreading the conductors of the pair further apart. The impedance can be lowered by putting them closer together. And, moving a ground closer to the differential signal pair lowers the impedance, while moving the ground further away raises the impedance.

It is noted that FIG. 8(*b*) represents a pattern of plated through holes in a circuit board. Accordingly, traces must come in from the board, on some inner layer of it, to the plus/minus half of each signal pair, and usually the two traces that form a differential pair in the circuit board run side by side on the same conductive layer on the printed circuit board. With reference to FIG. 8(*b*), the distance E can be made large enough to allow the trace to extend between the wafers to connect to the differential vias. One consideration in a broadside coupled connector is to allow sufficient space between adjacent pins or vias in a vertical column to be able to route to a differential pair from the side. The dashed lines represent the coupled differential signal pairs, which are approximately at an angle of 40-60° with respect to each other measured from the ground in the same row (see FIG. 8(*c*)), and preferably about 45°. In FIG. 8(*b*), the ground pairs are also at an angle of about 40-60° with respect to each other measured from the signal conductor in the same row, whereas in FIG. 8(*c*) the ground pairs are at an angle of about 20-40° with respect to each other.

Figure 9:
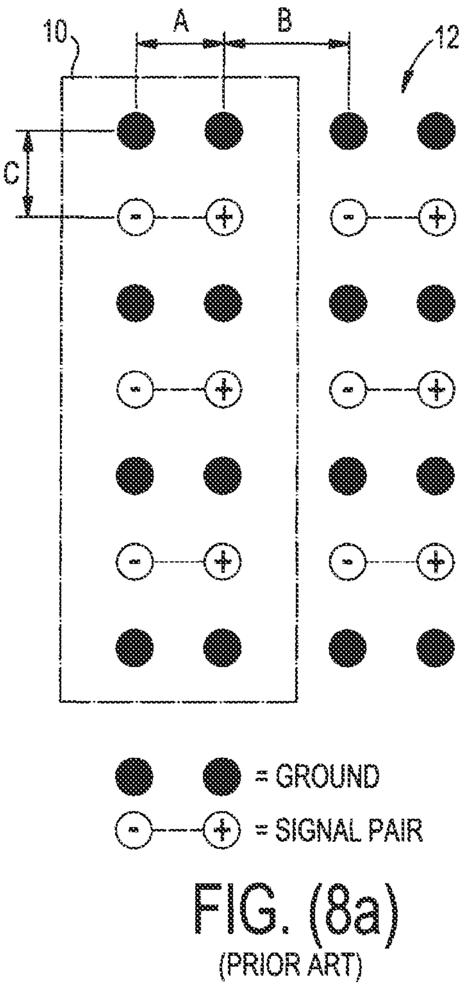
Figure 9:
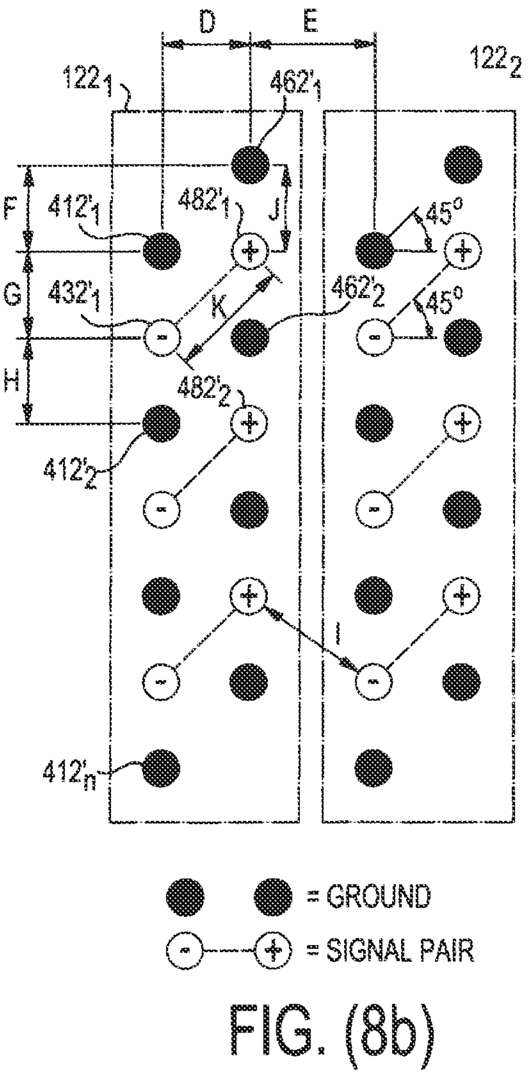
Figure 9:
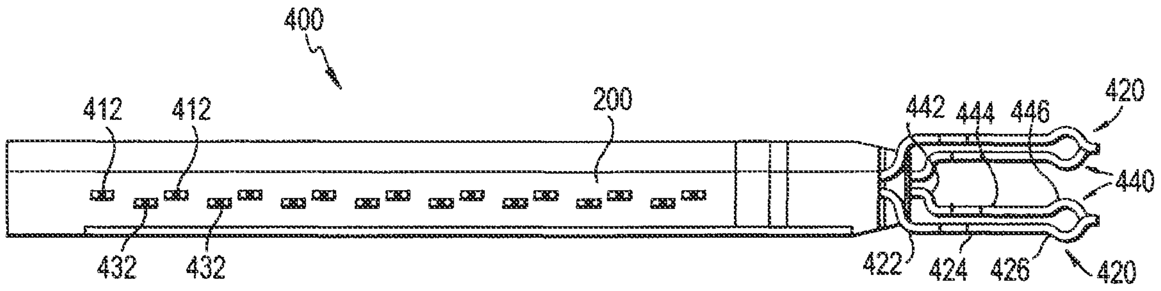
Figure 17A:
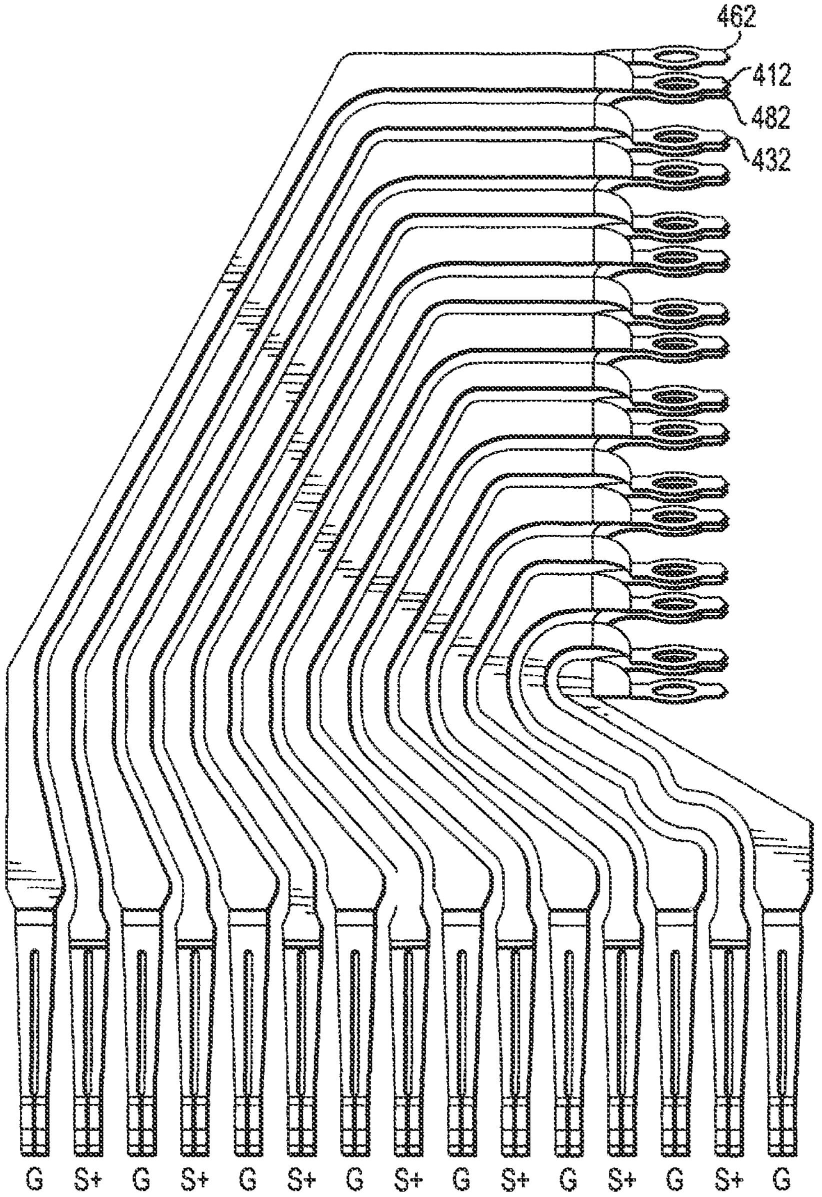
Figure 17B:
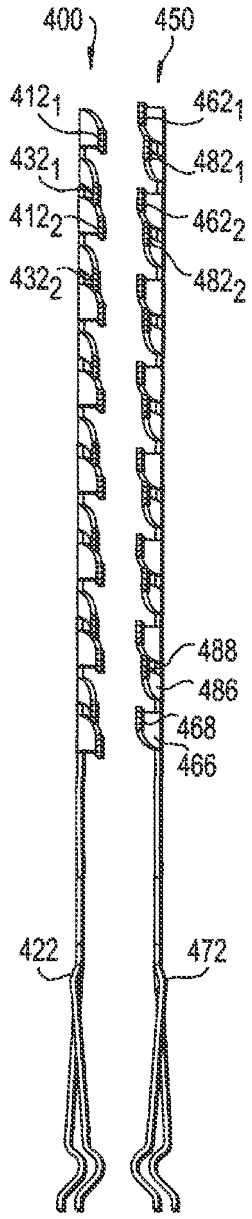

It should be noted that each wafer is shown in FIG. 8(*b*) as being formed into two straight columns and the pins 412 and 482 and holes 412' and 482' are aligned in rows. However, those pins and holes can be jogged in both the x- and y-directions to improve electrical performance, as shown in FIGS. 7, 9 and 17(*b*). For instance, as shown in FIG. 8(*c*), the vias can be moved within their columns to be closer to provide greater routing space. Thus, for instance, the signal vias 432' in the first column are moved closer to the ground vias 412' in that column. More specifically, the first signal via $432_1$' in the first column is moved closer (downward in the embodiment shown) to the second ground via $412_2$' in that column. Thus, the distance G is increased and the distance H is decreased, though the sum of those distances (G with H) between the ground vias $412_1$' and $412_2$' substantially remains the same. By increasing the distance G between the ground conductor $412_2$ and the signal conductor $432_2$, there is sufficient space between the ground via $412_2$' and the signal via $432_2$' to permit the edge-coupled differential pair of traces to extend to the near the signal via $432_2$' and the far signal via $482_2$' of a differential pair. In addition, the ground via $462_2$' is moved closer (downward) to the signal via $482_2$' to make sure that each signal via in the second column has a close ground and has symmetry with the signal vias in the first column.

That configuration provides sufficient space between the ground vias 412' and the signal vias 432' for the traces to come in and make the appropriate connections. As shown in FIG. 8(*c*), traces can extend down along the channel between the wafers, and come in between the ground via $412_2$' and the signal via $432_2$'. One signal trace connects with the signal via $432_2$', and the other signal trace continues to the far column to connect with the signal via $482_2$' for that differential signal pair.

FIG. 8(*d*) is similar to FIG. 8(*c*), except the columns of ground vias are shifted inwardly to be closer to one another within each wafer. Thus, the distance η between the ground vias 412' in the first column and the ground vias 462' in the second column is smaller than the distance between the signal vias 432' in the first column and the signal vias 482' in the second column. The ground vias 412', 462' are moved inwardly by about the distance of the via radius, so that the signal vias $432_1$', $432_2$' form a first column, the ground vias $412_1$', $412_2$' form a second column, the ground vias **462*i*', $462_2$' form a third column, and the signal vias 482*i*'**, $482_2$' form a fourth column. This arrangement permits better access to the far signal via $482_2$' since the ground via $412_2$' where the trace curves inward, is moved inward to be out of the path of the trace and therefore less obstructive. In addition, the distance μ between the ground conductors of one wafer and the ground conductors of the neighboring wafer, is increased.

FIGS. 1-8 have features (as discussed above) which are common to two preferred embodiments, referred to herein as a first preferred embodiment and a second preferred embodiment for ease of description. FIGS. 2-3, 9-15 further illustrate the first preferred embodiment of the invention. This first preferred embodiment can be utilized with the features described above with respect to FIGS. 1-8, or can be utilized separately. With reference to FIG. 3, the first set of conductors 400 are configured so that the ground contact portions 426 stagger in direction with respect to the signal contact portions 446. Thus, the ground contact portions 426 are shown convex facing downward so that they connect to a blade which is below them. And, the signal contact portions 446 are shown convex facing upward so that they connect to a blade which is above them. Likewise with respect to the second set of conductors 470, the ground contact portions 476 all face downward and the signal contact portions 496 face upward.

Figure 12:
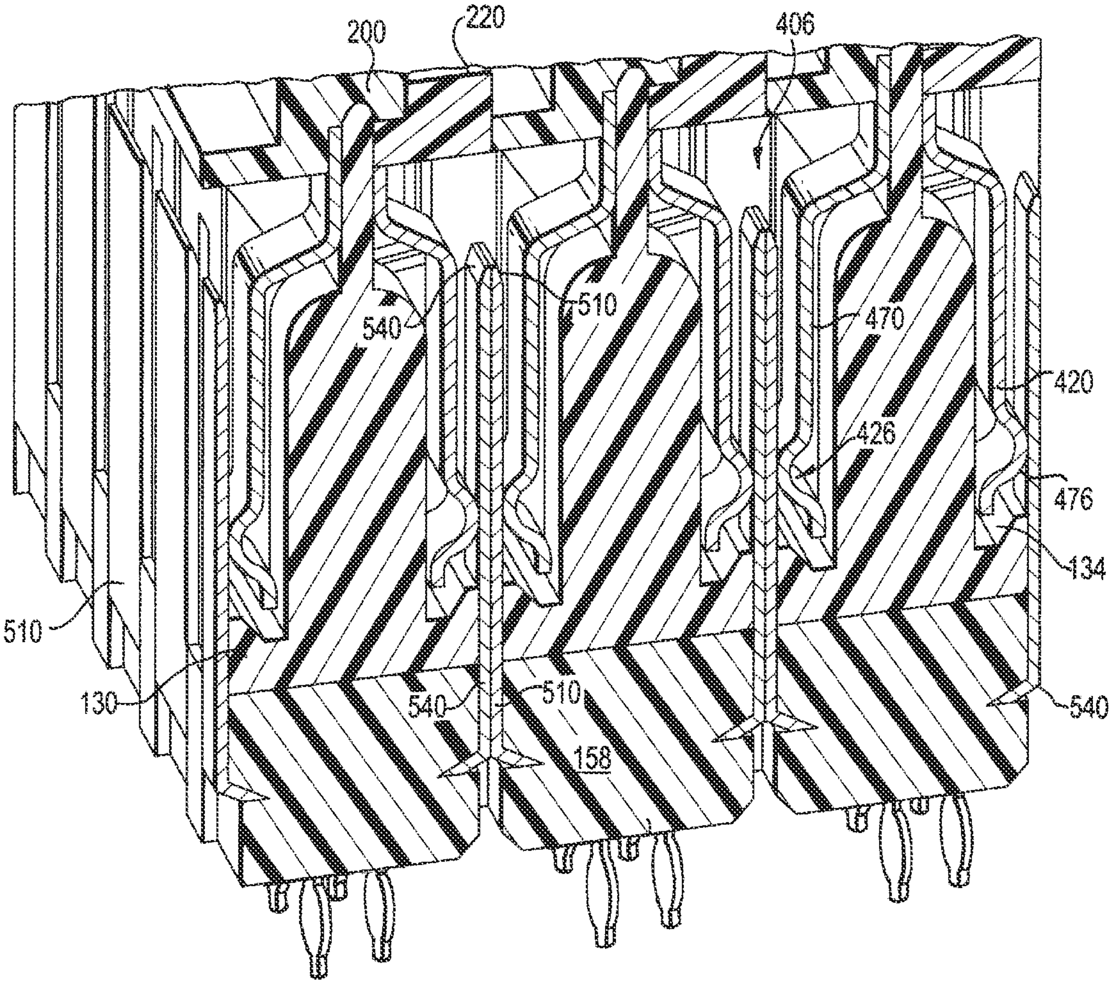
Figure 13:
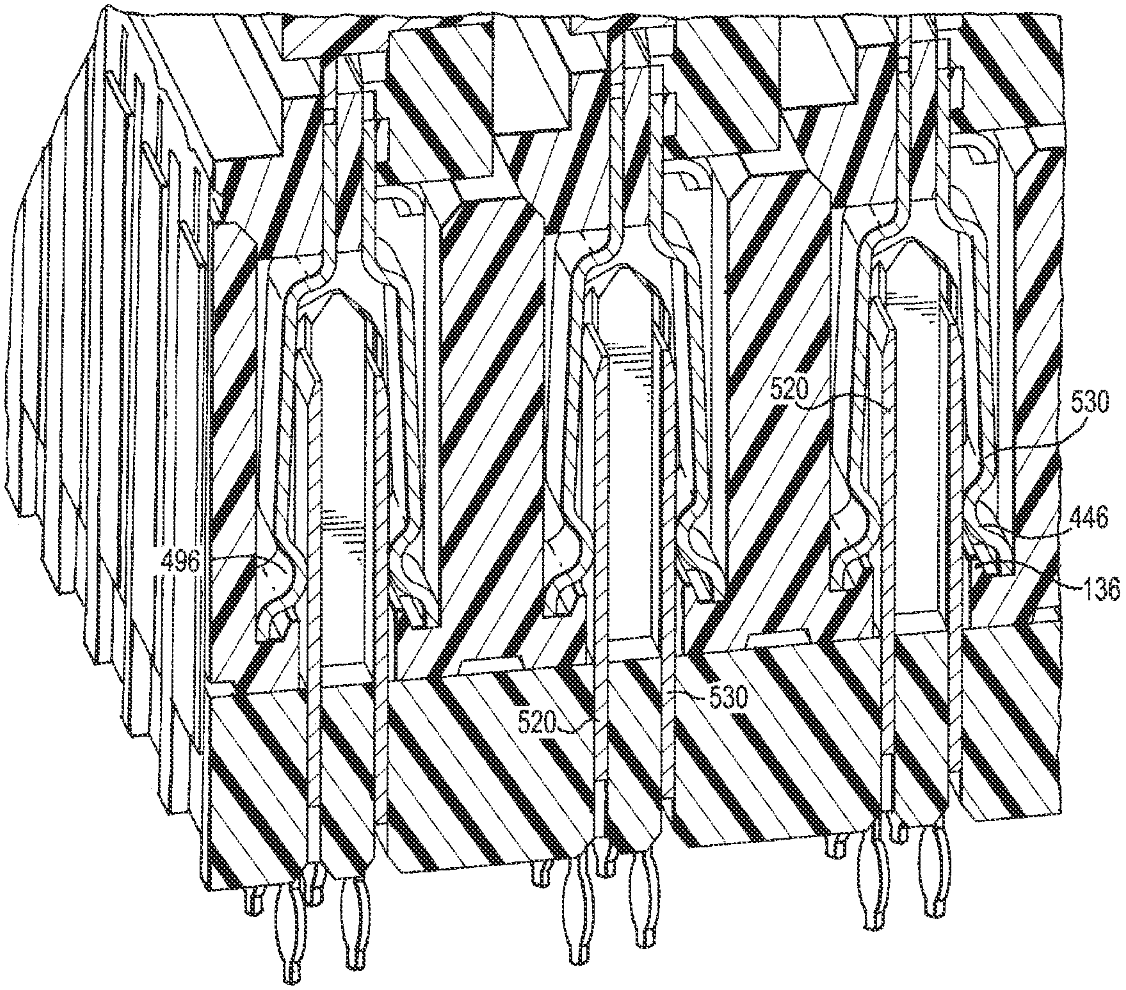

In addition, in the assembled state (FIG. 12), the first and second ground contacts 426, 476 face outward with respect to one another, whereby the first ground contact portions 426 (facing leftward in FIG. 12) face in an opposite direction than the second ground contact portions 476 (facing rightward in FIG. 12). As shown in FIG. 9, the first ground contact portions 426 face downward, and the second ground contact portions 476 face upward (outward with respect to each other, as shown in FIG. 9). And as shown in FIG. 13, the first and second signal contact portions 446, 496 face inward toward each other, whereby the first signal contact portions 446 face an opposite direction (leftward in FIG. 13) than the second signal contact portions 496 (rightward in FIG. 13).

As further shown in FIG. 9, the first ground bend portions 422 are offset with respect to the first signal bend portions 442. The first ground bend portions 422 occur further into the intermediate portion 414 than the first signal bend portions 442. Thus, the first ground beams 424 are slightly longer than the first signal beams 444, as best shown in FIG. 9. This provides clearance for the other features in the front housing 130. In addition, the first ground bend portions 422 are longer than the first signal bend portions 442. That is, the first ground bend portions 422 extend further outward (downward in the embodiment shown) than the first signal bend portions 442. This results in the intermediate portions 424 of the ground contacts 420 being aligned in a plane which is parallel to and apart from a plane in which the intermediate portions 444 of the signal contacts 440 are arranged. This also results in the signal conductors 440 of one wafer half being closer to the signal conductors 440 of the mating wafer half, while at the same time the ground conductors 420 of the mating wafer halves are further apart from each other. Accordingly, the ground contacts 420 face outward and the signal contacts 440 face inward, and the ground contacts 420 are outside of the signal contacts 440. Thus, the ground conductors 420 shield the signal contacts 440.

As shown in FIG. 3, the ground and signal bend portions 472, 492 of the second set of conductors 450 are arranged similar to the ground and signal bend portions 422, 442 of the first set of conductors 400. Thus, the ground bend portions 472 occur higher up on the intermediate portion than the signal bend portions 492. And, the ground bend portions 472 are longer than the signal bend portions 492. Accordingly, when the first and second sets of conductors 400, 450 are placed side-by-side, as shown in FIG. 7, the ground contact ends 420 of the first conductor half 400 are symmetrical (have the same size, shape and configuration) and aligned with the ground contact ends 470 of the second conductor half 450. And, the signal contact ends 440 of the first conductor half 400 are symmetrical and aligned with the signal contact ends 490 of the second conductor half 450.

As further illustrated in FIG. 7, the first and second conductors 400, 450 are arranged so that the bend portions 422, 442, 472, 492 project the mating ends 420, 440, 470, 490 outward away from each other. The first set of conductors 400 are arranged in a first plane, the second set of conductor 450 is in a second plane, the ground contact ends 420 are in a third plane, the signal contact ends 440 are in a fourth plane, the ground contact ends 470 are in a fifth plane, and the signal contact ends 490 are in a sixth plane. Each of the planes is parallel to and spaced apart from the other planes. The first and second planes are closest to each other, the third and fifth ground contact planes are the furthest apart, and the fourth and sixth signal contact planes are therebetween, respectively.

Figure 10:
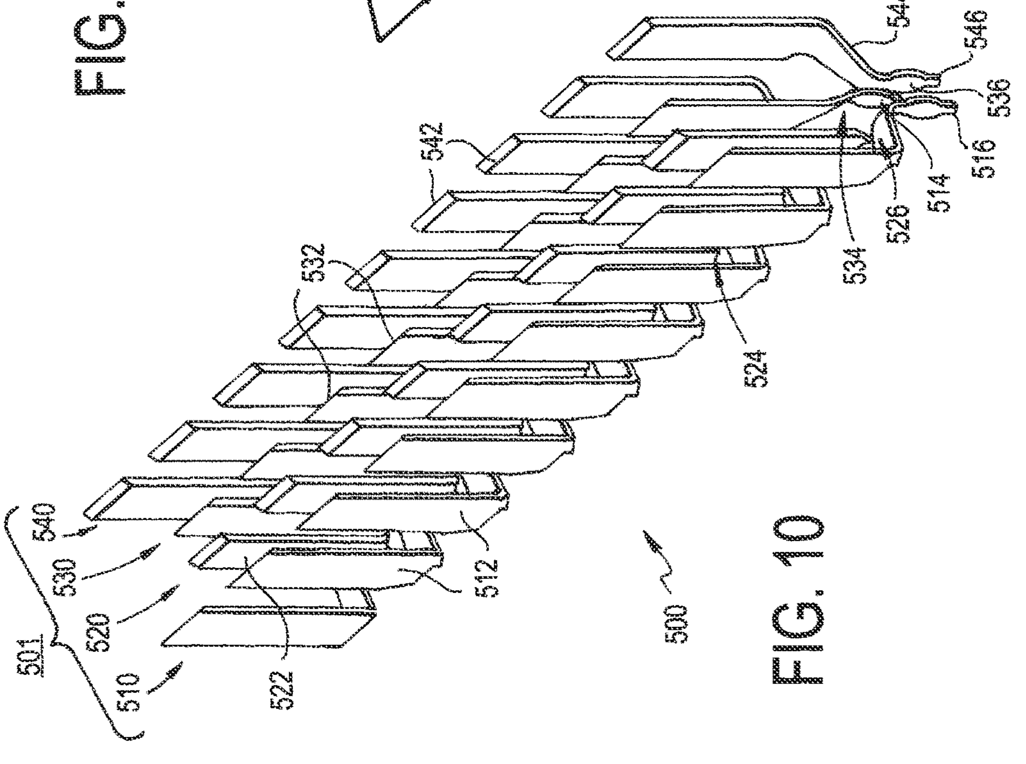

Referring back momentarily to FIG. 1, the wafers 122 of the daughter card connector 120 connect to the blades 500 of the backplane connector 150. The wafers 122 connect to the shroud 158, which in turn is connected to the contacts or blades 500 in the blade front housing 130. FIG. 10 shows the blades 500 of the backplane connector 150 in further detail. The blades 500 are arranged as a set of blades 501 which includes two columns of ground blades 510, 540 and two columns of signal blades 520, 530. The blades 500 are fitted within the front housing 130, and a single blade set 501 mates with a single wafer 122. Each of the blades 500 are a flat and elongated single piece, and have a flat, elongated and upright extending arm which forms a mating region 512, 522, 532, 542. The blades 500 further have a bend portion 514, 524, 534, 544, and a contact end 516, 526, 536, 546, both of which are narrower than the arm 512, 522, 532, 542. The bends 514, 524, 534, 544 comprise an S-shape double bend, which offsets the contact end 516, 526, 536, 546 from the mating region 512, 522, 532, 542. The contact ends 516, 526, 536, 546 have a longitudinal axis which is substantially parallel to a longitudinal axis of the mating region 512, 522, 532, 542. The contact end 516, 526, 536, 546 is shown as a contact tail that ends in a point and has a receiving hole.

The blades are configured in FIG. 10 so that the blade mating regions 512, 522, 532, 542 diverge outward away from each other. Accordingly, the tail contact ends 516, 526, 536, 546 are separated from each other by a first distance and the blade mating regions 512, 522, 532, 542 are at a second distance from each other that is greater than the first distance. The bends 514, 524, 534, 544 move the tail ends 516, 526, 536, 546 in the x, y, and/or z direction so that the tail ends 516, 526, 536, 546 can have a configuration as shown in FIGS. 8(*b*)-8(*e*). In addition, the signal mating regions 520, 530 do not diverge from each other as much as the ground mating regions 510, 540, so that the ground mating regions 510, 540 are on the outside of the signal mating regions 520, 530 to provide shielding of the signal conductors. The blades 500 converge with one another at their tails 516, 526, 536, 546 in a zipper pattern, whereby the tails 516, 546 of the ground blades 510, 540 alternate with the tails 526, 536 of the signal blades 520, 530. Thus, the ground blades 510, 540 align with one another to form differential signal pairs, and the signal blades 520, 530 align with one another to form pairs.

The arrangement of the blades 500 minimizes space requirements and confines the blades to a smaller amount of space at their tail ends 516, 526, 536, 546. Thus, the tail ends 516, 526, 536, 546 can be connected to the back plane or other board, where space is critical, while the mating ends 512, 522, 532, 542 are further apart so that they can be connected to larger electronic components such as the wafers 122 or a printed circuit board (PCB). The signal and ground blades 500 are configured in a skewed configuration with a known odd and even mode impedance. The coupling of the blades 500 occurs across the rows and the skew is the difference in the electrical path lengths between two conductors. In the present invention, identical conductors are placed next to each other to achieve a desired electrical impedance. The blades 500 are of identical length so that the electrical path lengths are the same and there is no skew.

The two inner signal blades 520, 530 do not offset as far as the outer ground blades 510, 540. In addition, the tails 516, 526, 536, 546 are not centered with respect to the arms 512, 522, 532, 542, but rather are offset in a transverse direction toward one side of the arms 512, 522, 532, 542. This allows the ground tails 516 to be aligned with the signal tails 526 in a first column when the blades 510, 520 converge. And, the ground tails 546 align with the signal tails 536 in a second column parallel to the first column when the blades 530, 540 converge. Each of the columns has alternating ground and signal tails 516, 526 and 536, 546, respectively. The tail end columns are parallel to and offset from the columns of the mating regions 512, 522, 532, 542.

As also shown in FIG. 10, the ground blade arms 512, 542 of neighboring ground pairs are aligned with each other to form the two outside columns 510, 540. And, the signal blade arms 522, 532 of neighboring signal pairs are aligned with each other to form two inside columns of blades 520, 530. In addition, the ground blade arms 512, 542 of each ground pair are aligned opposite each other, and the signal blade arms 522, 532 of each signal pair are aligned opposite each other. However, each ground pair is offset from each differential signal pair, so that each pair of signal blade arms 522, 532 is positioned between each pair of ground blade arms 512, 542. In this way, the signal blade arms 522, 532 align with the signal contact ends 440, 490 of the wafer 122, and the ground blade arms 512, 542 align with the ground contact ends 420, 470 of the wafer 122. The bends 516, 526, 536, 546 in the blades 500 and the offsetting of the tails 516, 526, 536, 546 create additional space so that wide blade arms 512, 522, 532, 542 can be utilized and connected to other connectors or boards, while at the same time having minimal space requirements at the tails for connecting to the back plane.

Figure 11:
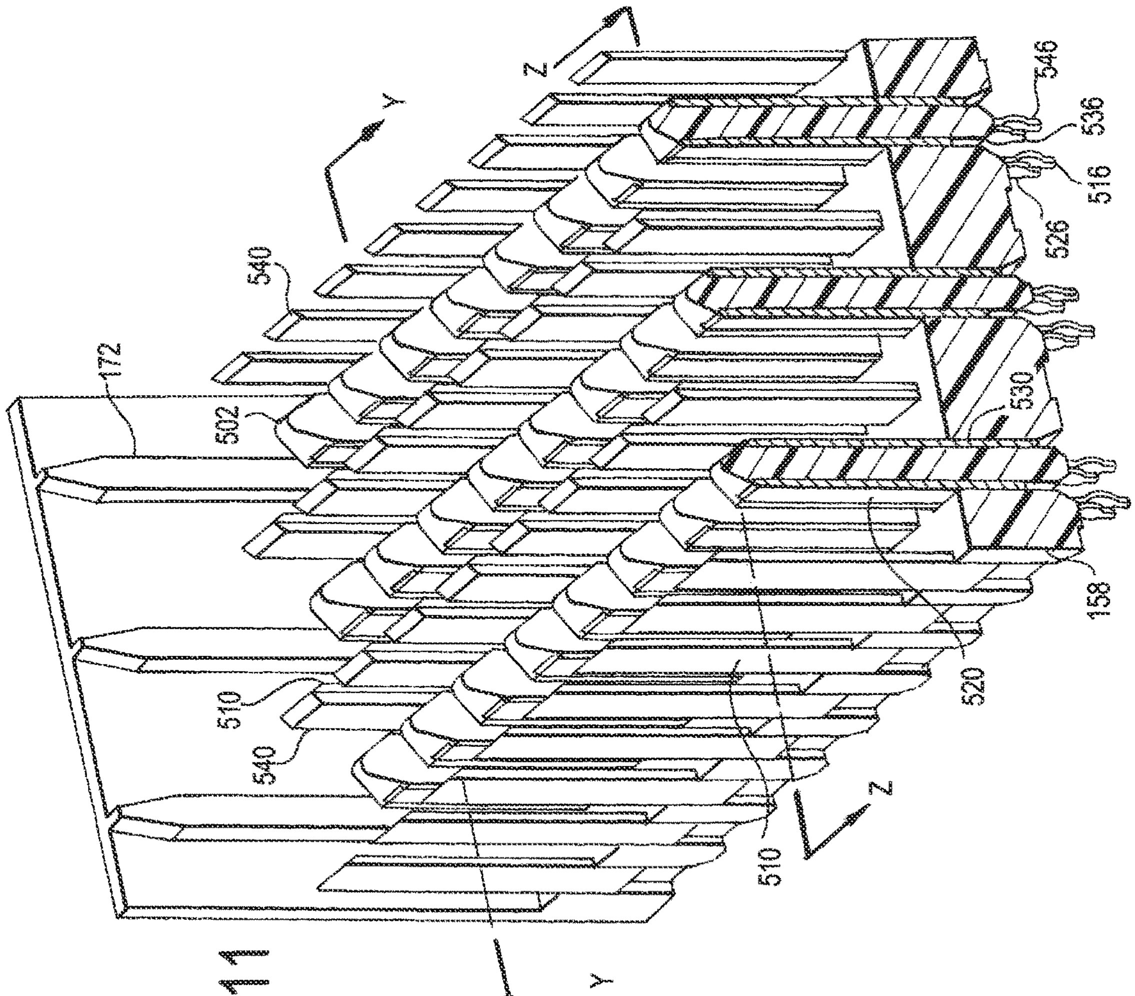

Turning to FIG. 11, the blade housing or shroud 158 is shown having insulative posts 502 that extend upright from the bottom of the housing 158. The signal blades 520, 530 are affixed to opposite sides of the posts 502. The posts 502 support the signal blades 520, 530 and help to prevent stubbing of the blades 500 when the wafer 122 is received in the housing 158. There are three sets of blades 501 shown in FIG. 11, so that the shroud 158 can receive three wafers 122. The ground blades 510, 540 from one blade set 501 contact and butt up against the ground blades 510, 540 from an immediately adjacent blade set 501. Those back-to-back freestanding ground blades 510, 540 are positioned between the posts 502. Though two ground blades 600, 620 are shown back-to-back, a single ground blade can be provided. The signal blades 520, 530 are shorter than the ground blades 510, 540 so that contact is first made with the ground blades 510, 540 to dissipate any static discharge.

Receiving channels are formed between the columns of the ground blades 510, 540 and neighboring columns of the signal blades 520, 530. Each ground set 501 has two channels, so that the number of channels corresponds to the number of paired columns of signal blades 520, 530 and ground blades 510, 540. In the embodiment shown, there are six channels, six rows of signal blades 500 and four rows of ground blades 550.

As shown, the shroud 158 has a bottom which is formed by being molded around a lower portion of the blades 500 which includes the bend portions and a portion of the arms. The tail ends 516, 526, 536, 546 extend outward on the exterior of the housing out from the bottom of the housing 158. The blade arms 512, 522, 532, 542 extend inwardly on the interior of the housing from the bottom of the housing in an upright fashion. The housing 158 can be formed by molding, extrusion or other suitable process. The blade housing 158 is made of insulative material so that it does not interfere with the signals carried on the blades 500.

Elongated guide ribs 172 are provided that extend along the inside surface of the housing ends. The ribs 172 direct the wafers 122 into the housing 158 so that the conductors 400, 450 of the wafers 122 align with and connect to the respective blades 500 situated in the housing 158. As shown, the guide ribs 172 are tapered at the top to further facilitate the engagement, and the tops of the blades 500 are beveled to avoid stubbing during mating with the conductors 400, 450.

FIG. 1 illustrates the connector assembly 100 where the wafers 122 are connected together by the stiffener 128, and the contact ends 124 are inserted into the shroud 158. The space savings aspects of the present invention are also shown, where the space needed for the tail ends 516, 526, 536, 546 of the blades 500 is substantially reduced with respect to the space allotted for the blade arms 512, 522, 532, 542 to connect with the shroud 158.

FIGS. 12 and 13 are cross-sections of the shroud 158 fully inserted into the blade front housing 130 (FIG. 1) so that the signal and ground conductors 400, 450 are engaged with the blades 500. The cross-section of FIG. 12 is taken along line Z-Z of FIG. 11 which cuts through the ground blades 510, 540 and between the posts 502; whereas FIG. 13 is taken along line Y-Y which cuts through the signal blades 520, 530 and the posts 502.

Referring to FIGS. 7, 9 and 12, the ground contact portions 426, 476 of the ground conductors 420, 470 face outwardly, and the bend portions 422, 472 also protrude outwardly. Thus, in FIG. 12, the ground contact portions 426, 476 connect with the ground blades 510, 540 when the wafer 122 is inserted into the housing 158. The guide rib 172 on the side of the shroud 158 aligns the ground contact portions 426, 476 with the ground blades 510, 540. As the wafer 122 is being inserted into the housing 158, the curved contact portions 426, 476 contact the beveled top of the ground blades 510, 540.

The ground conductor ends 420, 470 are configured to be slightly wider than the distance between the ground blades 510, 540. Accordingly, as the ground contact ends 420, 440 are received in the channels, the ground contact portions 426, 476 contact the beveled top of the ground blades 510, 540. Because the ground contact portions 426, 476 have a curved leading face, and the top of the ground blades 510, 540 are beveled inwardly, the ground conductors 420, 470 are forced inwardly by the ground blades 510, 540. The ground contact ends 420, 470 are slightly biased outwardly to ensure a good coupling between the ground conductors 420, 470 and the ground blades 550.

Turning to FIGS. 7, 9 and 13, the contact portions 446, 496 of the signal conductor ends 440, 490 couple with the signal blades 520, 530 when the wafer 122 is inserted into the shroud 158. The signal conductor ends 440, 490 are configured to be slightly closer to each other than the width of the posts 502 and the signal blades 520, 530. Accordingly, as the signal contact ends 440, 490 are received in the channels, the tip of the signal contact portions 446, 496 come into contact with the beveled top of the signal blades 520, 530 and/or posts 502. Because the signal contact portions 446, 496 have a curved leading face, and the top of the signal blades 520, 530 and post 502 are beveled outwardly, the signal conductors 440, 490 are forced outwardly into the channels. The signal conductor ends 440, 490 are therefore biased inwardly with respect to the posts 502 and the signal blades 520, 530 to ensure a good contact between the signal contact portions 446, 496 and the signal blades 520, 530.

The signal and ground conductors are configured in a non-skewed configuration with known odd and even mode impedance. The coupling of conductors occurs across the columns and the skew is defined as the differences in the electrical path lengths between two conductors of a given differential pair. The identical conductors are placed across from each other to achieve a desired skew. The posts 502 are strong and support the signal blades 520, 530 to prevent them from moving during connection. The back-to-back arrangement of the ground blades 510, 540 also provides a strong configuration since the ground blades 510, 540 support each other.

As shown in FIGS. 12 and 13, the front housing 130 has a general inverted T-shape cross-section formed by a center member and a cross-member at the bottom of the center member. An upwardly-extending lip 134, 136 is formed at the ends of the cross-member. The lip 134, 136 retains the tip of the respective conductors 410, 420, 470, 490 to provide a pre-load for those conductors. Referring momentarily to FIG. 9, the ground conductor is jogged downward more than the signal conductor, but then their tips come together so that the tips of the ground beam 424 are substantially aligned with the tips of the signal beam 444. As shown in FIGS. 12 and 13, the tips are retained by a lip 134 and have a pre-load force which also prevents the conductors 400, 450 from stubbing on a blade if, for instance, the blade is bent. The front housing 130 and lips 134, 136 make sure that the blades do not get on the wrong side of the conductors 400, 450. Before the wafer 122 is mated with the shroud 138, the mating portions 420, 440, 470, 490 are biased outward to rest on the lips 134, 136. Accordingly, when the wafer 122 is being inserted into the shroud 138, the beams exert a more uniform and normal force due to the pre-load. That force improves the reliability of the connection between the conductors 400, 450 and the blades 500 and allows for a desired level of normal force over a shorter displacement distance of the conductor 400, 450, as well as a low insertion force. As shown in FIG. 13, the insulated posts 502 can be constructed to have an air-filled hollow interior between the signal blades 520, 530. The lower dielectric constant of air compared with insulator allows a higher dielectric constant to be obtained.

Figure 14:
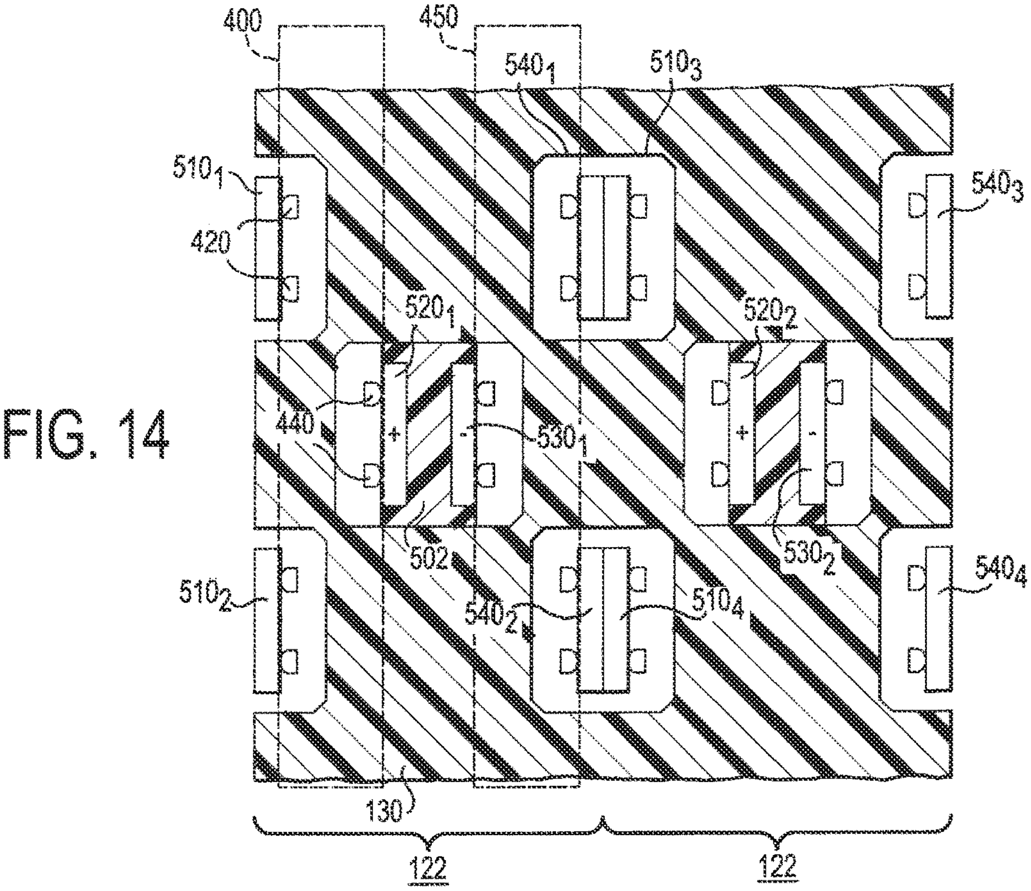

FIG. 14 shows a top view of the front housing 130, blades 500 and conductors 400, 450. This embodiment illustrates how the wafers 122 are positioned within the front housing 130. As shown, the signal blades 520, 530 can be embedded in opposite sides of the post 502, so that they come flush with the outer surface of the post 502. In this way, the post 502 prevents the blades 520, 530 from moving backward or side-to-side. However, the blades 520, 530 can be attached to or rest on the surface of the post 502 and need not embedded. In addition, the bifurcated conductors 420, 440 have a coined D-shaped cross section, with the curved side facing the respective blades 510, 520. This provides a reliable contact between the conductors 420, 440 and the blades 510, 520.

The ground blades 510, 540 are all connected to the same ground in the boards, so they can be placed back-to-back. The signal blades 520, 530 are either plus or minus, so they are arranged independent of one another and spaced apart by the insulative post 502. The post 502 makes them much stronger than a single free-standing blade would be alone, and less prone to being bent or deformed. Similarly, the back-to-back ground blades 510, 540 are more robust than a single free-standing ground blade.

Figure 15A:
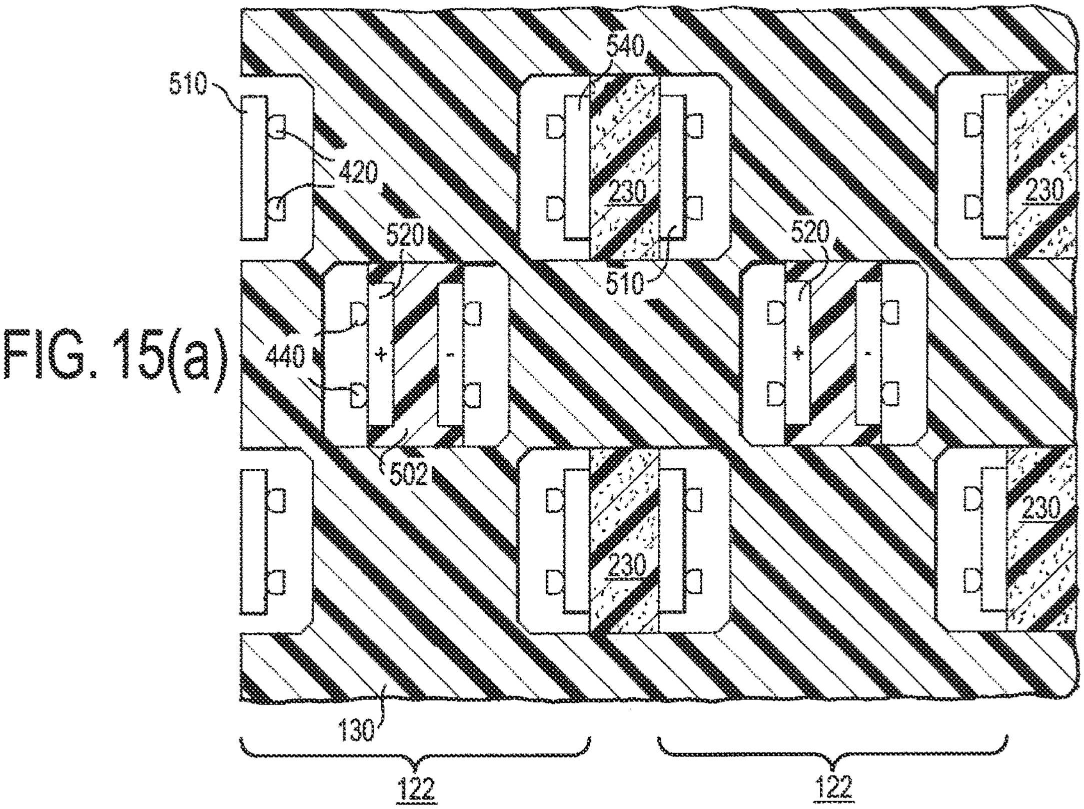

An alternative embodiment to FIG. 14 is shown in FIG. 15, where an elongated lossy material 230 is positioned between the wafers 122. The lossy material 230 prevents resonant coupling between the ground blades 510, 540, which are arranged back-to-back in FIG. 13. The lossy material 230 allows for the control of resonances in the ground system formed by the independent ground conductors 510, 540. The lossy material is preferably a lossy conductive polymer filled with carbon or other conductive particles, as described above. Though the lossy material 230 is shown as a single piece, it can be more than one piece, with one lossy material provided on each wafer 122. The lossy material 230 is close to or in contact with these ground blades, which prevents the ground blades 510, 540 from resonating with respect to each other and it adds loss to ground system resonances while not adding appreciable loss to the signal pairs because it's spaced apart from them. The material 230 could be insulative or it could be the lossy in some portion of the intermediate part of the connector. It could be a snap-on piece or it could be molded over. The lossy material 230 need not be in direct contact with the ground blades 510, 540. Rather, the lossy material can be spaced from the ground blades 510, 540 and capacitively coupled with the ground blades 510, 540.

Turning to FIG. 15(*b*), an alternative post 502 configuration is shown. In FIGS. 14 and 15(*a*), the blades 520, 530 are shown aligned on a post 502. In FIG. 15(*b*), the elongated blades 520, 530 are offset with respect to one another in a transverse direction by about one-half the width of the blades 520, 530. Accordingly, the blades 520, 530 overlap with each other by half a width. This reduces coupling and raises the impedance by moving the center-to-center distance between the blades 520, 530 further apart. This is achieved without increasing the horizontal spacing required.

As further shown in FIGS. 14 and 15(*a*), each differential signal pair 520, 530 is positioned at the center of a square formed by adjacent ground blade conductors 510, 540. Thus, the ground blades 5101, 5102, 5401, 5402 being in adjacent columns. The ground blade 5101 being adjacent ground blade 5102 in the first column; ground blade 5401 being adjacent ground blade 5402 in the second column. The ground blades 5101, 5102 of the first column are aligned with the ground blades 5401, 5402 in the second column to form parallel rows. Accordingly, the adjacent columns and rows of ground blades substantially form a rectangle. The differential signal pairs 520, 530 are located in columns and rows. The signal pairs 520, 530 are offset from and positioned between the columns and rows of ground blades, so that the signal pair blades 520, 530 are substantially at the center of the rectangle of ground blades 510, 540. Thus, for instance, the differential signal pair blades 5201, 5301 are at the center of the rectangle formed by the ground blades 5101, 5102, 5401, 5402. This symmetrical relationship emulates the desirable electrical characteristics of a twinax connection, with the ground blades 5101, 5102, 5401, 5402 shielding the differential signal pair blades 5201, 5301.

To summarize the first preferred embodiment of FIGS. 2-3, 9-15, low crosstalk, high density and impedance control is provided by jogging signal and ground mating ends 420, 440, 470, 490 differently from each other. The pressfit contact pins on the daughter card and backplane connectors can be jogged as desired.

Figure 16:
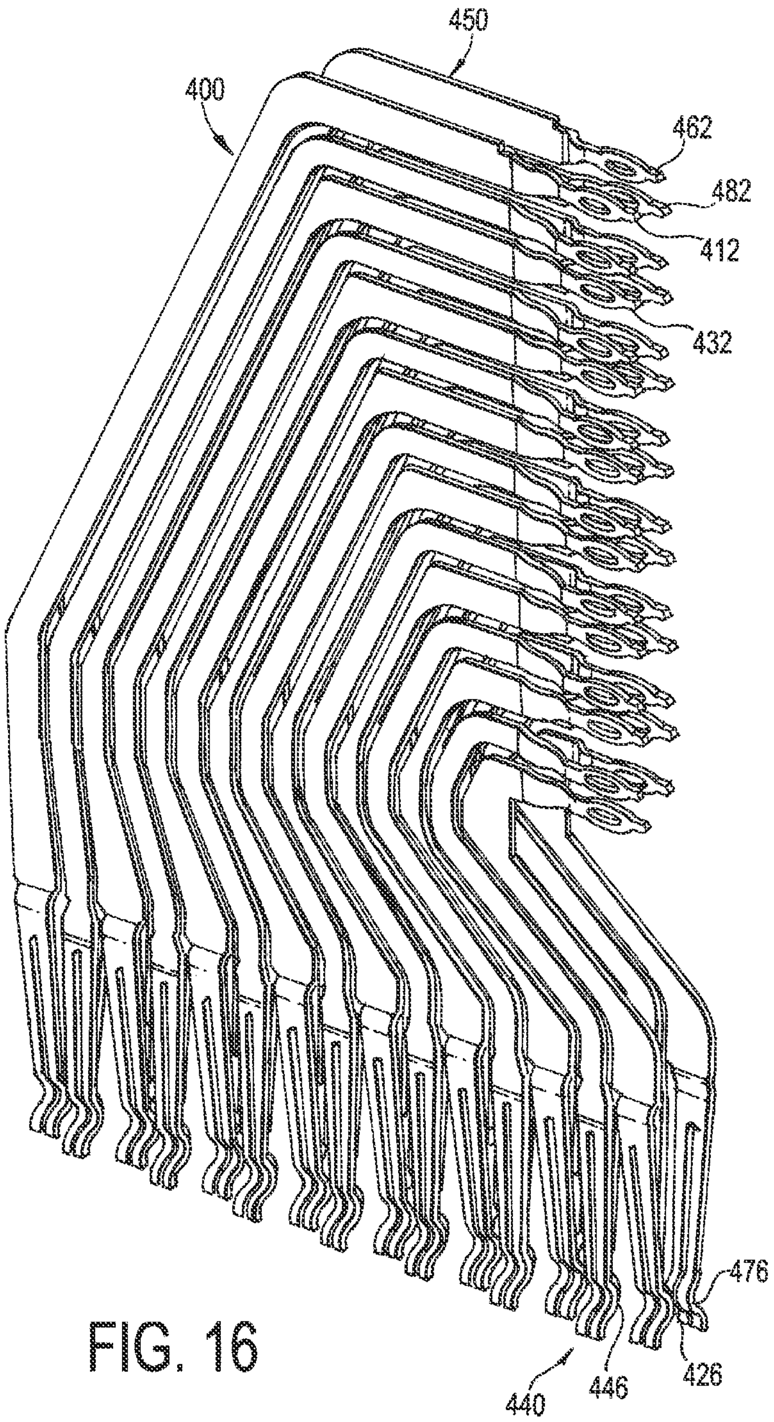
FIGS. 16-23 show the connector in accordance with the second preferred embodiment of the invention; where

FIGS. 16-24 illustrate a second preferred embodiment of the invention. This second preferred embodiment can be utilized with the features of the invention described with respect to FIGS. 1-8, or can be utilized separately. Referring initially to FIG. 16, the present invention has a first and second set of conductors 400, 450, as in the first preferred embodiment (for instance, see FIG. 7). However, the concave contact portions 426, 446, 476, 496 all face in the same direction inwardly. Namely, the contact portions 426, 446 of the first set of conductors 400 face the second set of conductors 450 and the contact portions 476, 496 of the second set of conductors 450 all face the first set of conductors 400.

In addition, the signal contact ends 440, 490 are straight (no bend portion) and aligned in the same plane as the intermediate portion 434, 484 of the signal conductor 430, 480. The ground conductor ends 420, 470, on the other hand, contain minimal bend portions 422, 472. The bend portions 422, 472 are a slight single bend inward, compared with the sharp double S-shaped bends of the first embodiment (compare with FIGS. 3 and 9). In this way, as best shown in FIG. 17(*b*), the ground contact portions 426 are offset from the signal contact portions 446 in the first set of conductors 400, and the ground contact portions 476 are offset from the signal contact portions 496 in the second set of conductors 450. In addition, the ground contact portions 426 of the first set of conductors 400 are aligned in a first row, and the signal contact portions 446 are aligned in a second row. The ground contact portions 476 of the second set of conductors 450 are aligned in a third row and the signal contact portions 496 are aligned in a fourth row, with all of the rows being parallel to and spaced apart from one another. The first and third rows are closer together than the second and fourth rows, such that the ground contact portions 426 and 476 are closer to each other than the distance between the signal contact portions 446 and 496.

Turning to FIG. 17(*a*), (*b*), the alignment of the first contact ends 412, 432, 462, 482 is shown, which are further represented in FIG. 8(*d*). The contact ends 412, 432, 462, 482 each have a respective bend portion 416, 436, 466, 486 and a pin 418, 438, 468, 488. The bend portion 416, 436, 466, 486 are jogged vertically and horizontally to achieve reduced crosstalk and increased density in the daughter card. For instance, in the vertical direction for the second set of conductors 450, the space between the first ground end $\mathbf{462}_1$ and the first signal end $\mathbf{482}_1$ is smaller than the space between the first signal end $\mathbf{482}_1$ and the second ground end $\mathbf{462}_2$. This permits the space in-between the signal ends 482 and the spacing to the nearest adjacent ground ends 462 to be separately controlled. The signal-to-signal spacing and the ground-to-ground spacing in the right-hand lead frame half 450 can be maintained constant, while coupling the signal end 482 to its nearest ground end 462 by moving it back and forth. It also opens up a space to the left-hand side for a wider trace routing channel to bring a trace in from the left, under the left topmost ground plated through hole into the signal. And, this configuration provides an opportunity for improved impedance matching of the plated through holes and conductive portions inserted in them, especially if the desired impedance is relatively higher (e.g., 100 ohm) by allowing the two halves of the signal pair to be spaced relatively wider apart.

In addition, the ground bend portions 416, 466 extend further outward from the respective ground intermediate portions 414, 464 than the signal bend portions 436, 486 extend from the respective signal intermediate portions 434, 484. Accordingly, the ground tips 418 are aligned along a first line, and the signal tips 438 are aligned along a second line parallel to the first line. And, the ground tips 468 of the second conductors 450 are aligned along a third line, and the signal tips 488 are aligned along a fourth line parallel to the first, second and third lines.

Figure 18:
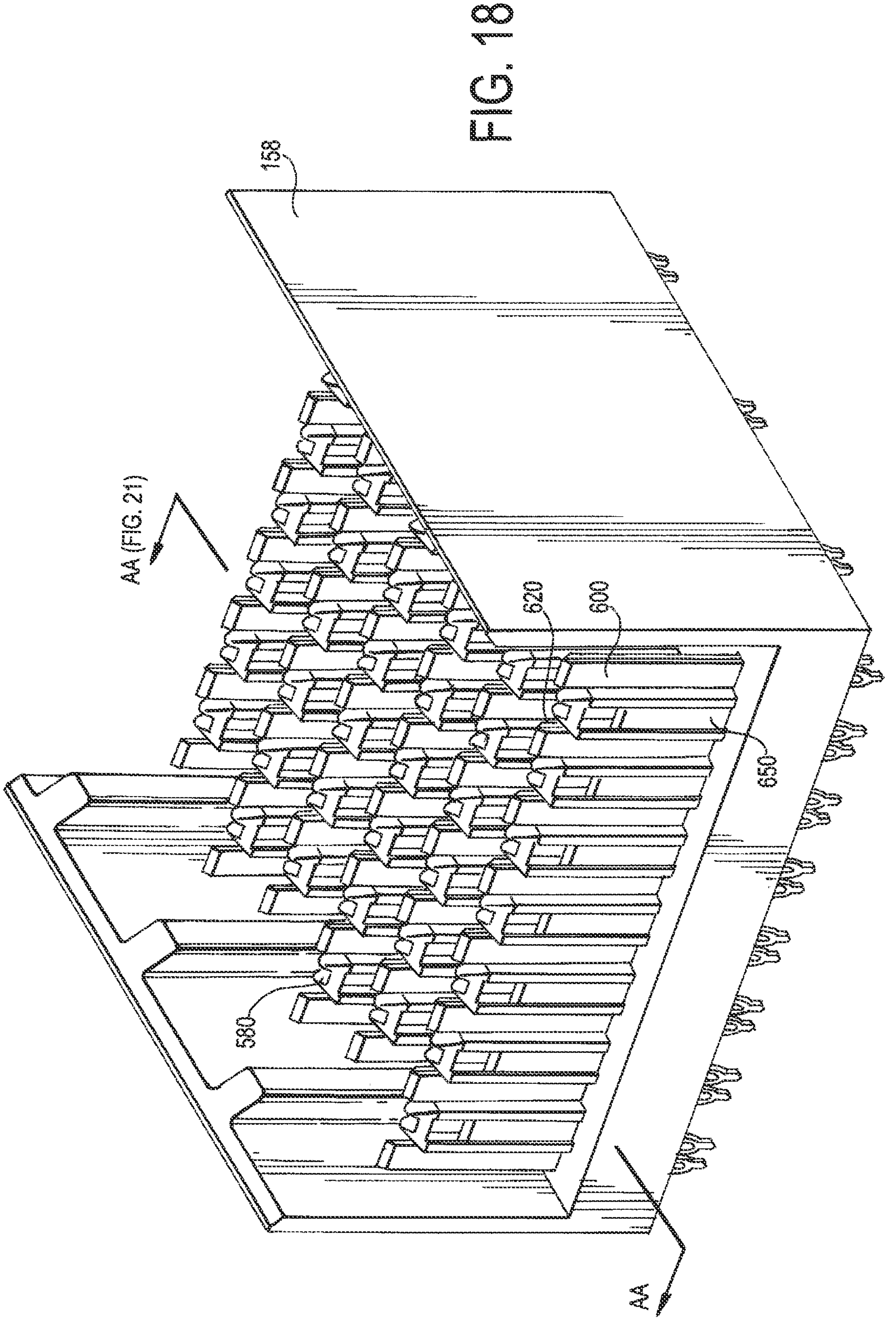

Turning to FIG. 18, the configuration of the shroud 158 is shown in accordance with the second preferred embodiment of the invention. Six column lines are shown, each having a first and second set of ground blades 600, 620 alternating with a first and second set of signal blades 650, 670 affixed to the posts 580. Accordingly, the ground blades 600, 620 are substantially aligned with the signal blades 650, 670 in the columns, though the signal blades 650, 670 are somewhat offset against the posts 580. This contrasts to the first embodiment where, as best shown in FIG. 14, the posts 502 and signal blades 520, 530 are offset from the ground blades 510, 540.

Figure 19:
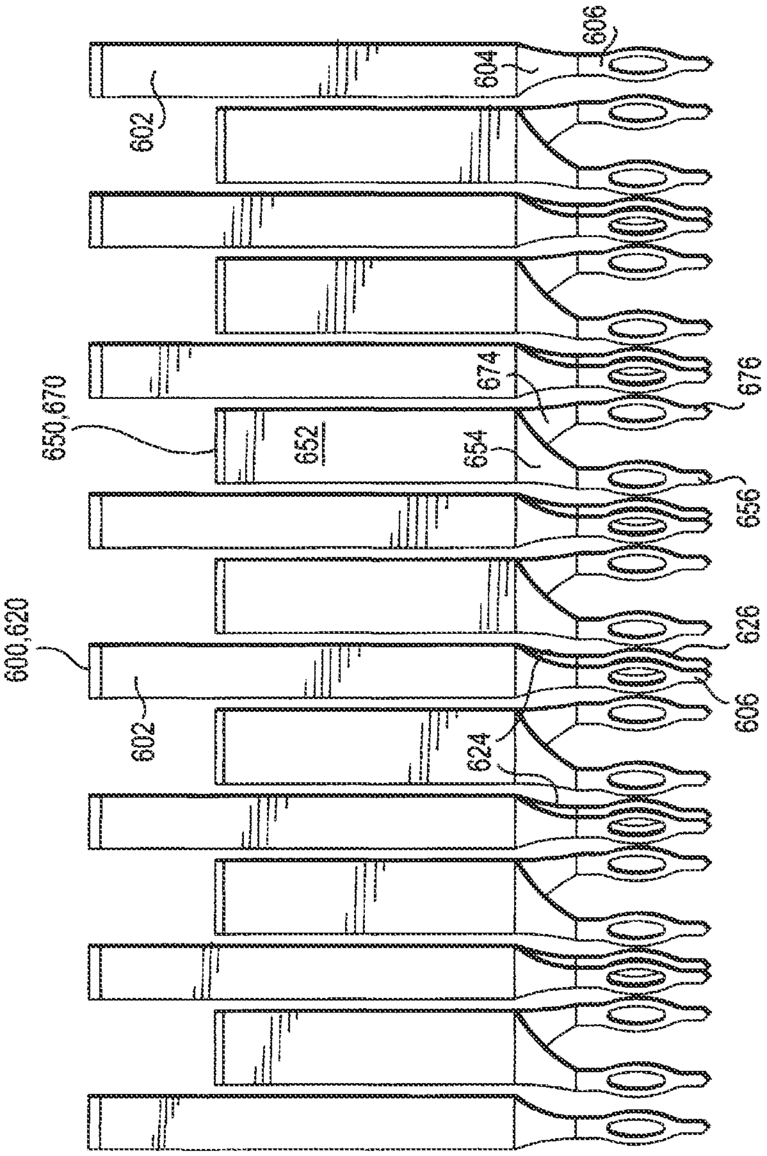

The first set of ground blades 600 are each aligned with one of the second set of ground blades 620 to form a pair, and each of the first signal blades 650 are aligned with one of the second signal blades 670 to form a differential signal pair. Each column of ground and signal blades 600, 620, 650, 670 mates with a single wafer 122 of FIG. 16. FIG. 19 shows the blades without the posts 580 or housing 158. As shown, the ground blades 600, 620 have an elongated mating region 602, 622 at one end, and a bend portion 604, 624 and contact pin 606, 626 at the opposite end. Likewise, the signal blades 650, 670 have an elongated mating region 652, 672 at one end, and a bend portion 654, 674 and contact pin 656, 676 at the opposite end.

Figure 20:
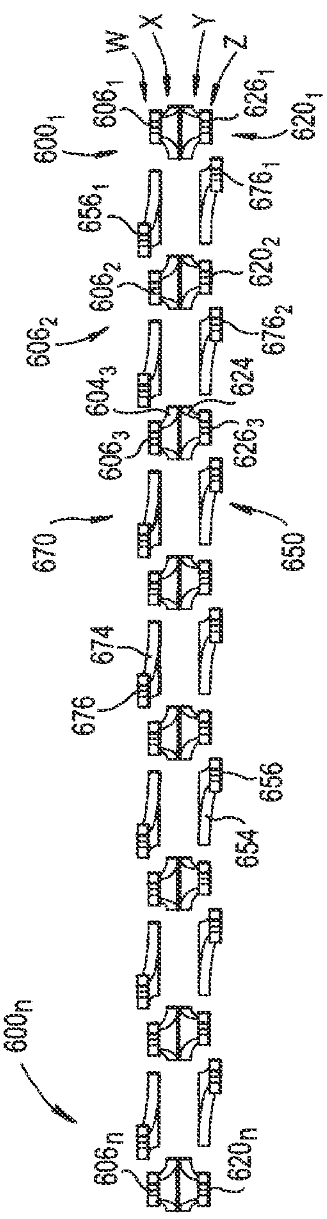

As further shown in FIGS. 19 and 20, the pins are aligned in various parallel columns spaced apart from one another: a first column W having the pins 656, a second column X having the pins 606, a third column Y having the pins 626, and a fourth column Z having the pins 676. The ground blades $\mathbf{600}_1$, $\mathbf{620}_1$ and $\mathbf{600}_n$, $\mathbf{620}_n$ are located on the two opposite ends of the column. The first ground tips $\mathbf{606}_1$, $\mathbf{606}_n$ for those end first ground blades $\mathbf{600}_1$, $\mathbf{600}_n$ are aligned with the second ground tips $\mathbf{626}_1$, $\mathbf{626}_n$ of the end second ground blades $\mathbf{620}_1$, 620*n*, respectively. And, those end ground tips $\mathbf{606}_1$, $\mathbf{606}_n$, $\mathbf{626}_1$, $\mathbf{626}_n$ are slightly offset (jogged to the right in the embodiment shown) in a first transverse direction with respect to the longitudinal axis of the mating region $\mathbf{602}_1$, $\mathbf{602}_n$, $\mathbf{622}_1$, $\mathbf{622}_n$. The inside ground tips, such as $\mathbf{606}_2$, for the first ground blade $\mathbf{600}_2$ are slightly offset in a second transverse direction opposite the first transverse direction, with respect to the mating region $\mathbf{602}_2$. The mating ground tip $\mathbf{626}_2$ for the second ground blade $\mathbf{620}_2$ is offset in the first transverse direction.

The tips 656 are moved (toward the left in the embodiment) in their respective column toward the ground blades 600. The tips 676 are moved (toward the right in the embodiment) toward the ground tips 620. The distance between the signal tips 656, 676 to their respective ground blades 600, 620 are the same, but provide a greater space behind the signal blades 600, 650 for routing. It should be appreciated that other configurations of the ground pins can be utilized, and the ground pins need not be offset as shown.

The signal tips 656, 676 are also offset transverse to the longitudinal axis of their mating regions 652, 672, with the signal tips 656 of the first set of blades 650 offset in the first transverse direction and the signal tips 676 of the second set of blades 670 offset in the second transverse direction opposite the first transverse direction. Accordingly, the differential signal pair tips, such as $\mathbf{656}_1$ and $\mathbf{676}_1$ are moved closer to the adjacent ground blades $\mathbf{600}_2$ and $\mathbf{620}_1$, respectively. In this way, the differential signal pair tips $\mathbf{606}_1$, $\mathbf{626}_1$ are further from each other to achieve a desired characteristic impedance, and closer to ground, to reduce crosstalk.

As further shown, the blade mating portions 602, 622, 652, 672 and the contact pins 606, 626, 656, 676 are flat. The ground blade mating portions 602 of the first set of blades 600 are aligned in a first column and first plane, the ground blade mating portions 622 of the second set of blades are aligned in a second column and second plane, the signal blade mating portions 652 of the first set of blades 650 are aligned in a third column and third plane, and the signal blade mating portions 672 of the second set of blades 670 are aligned in a fourth column and fourth plane. All of the columns and planes are parallel to each other, with the first and second ground blade columns being adjacent one another, and the third and fourth signal blade columns being outside the first and second ground blade columns.

As best shown in FIG. 20, the blade bend portions 604, 624, 654, 674 are also jogged in an outward direction with respect to the mating pair and the planes of the respective mating regions 602, 622, 652, 672. Accordingly, the ground bend portions extend outwardly away from each other (up and down in the illustration) so that the pins 606, 626 are spaced apart. The mating region 602, 622 (FIG. 19) of the signal blade pairs, for instance pair $\mathbf{656}_1$, $\mathbf{676}_1$, are separated from each other by the insulative post 580 (FIG. 18), and the bend portions 604, 624 extend slightly further outward. Thus, the first set of ground pins 606 are in a second column, the first set of signal pins 656 are in a first column, the second set of ground pins 626 are in a third column, and the second set of signal pins 676 are in a fourth column. The first and fourth signal pin columns are separated by a distance which is greater than the separation between the second and third ground pin columns. Therefore, the signal pin columns are separated further than the ground pin columns. By jogging, the signals are far enough apart that the characteristic impedance is not too low, permitting for instance 100 ohms or 85 ohms differential. At the same time, crosstalk is reduced by providing a nearest ground pin for each signal pair half, simultaneously providing a wide access channel for routing traces to the pair (as with FIG. 8). The separation of the columns creates a routing access channel either above, below or between the pin columns.

So in the mating interface (FIG. 19), a signal blade 652, 672 is centered between two ground blades 602, 622. But, when it comes down to the pressfit interface (FIG. 20), the signal conductor pressfits 656, 676 gets biased over to one of the ground pressfits 606, 626. The signal pressfits 656, 676 are jogged to the left and right, respectively. That creates a routing access channel which allows a differential pair to be brought in. For instance, if a differential pair comes in from the lower left side in FIG. 20, and is to be routed to the first differential signal pair $\mathbf{656}_n$, $\mathbf{676}_n$, it can come in from the lower left, extend horizontally along the routing access channel, and connect with those pins. Those traces would be approximately the same length since it need not extend around a ground contact, plated through-hole, or other obstruction. Thus, a routing space is accessible from one side or the other by jogging the signal pins, and the corresponding plated through-holes off-center (see generally FIGS. 8(*c*), (*d*)). In addition, the signal pair halves $\mathbf{656}_n$, $\mathbf{676}_n$ are positioned closer to a ground $\mathbf{606}_n$, $\mathbf{620}_n$, which improves the electrical characteristics and reduces crosstalk by providing a nearby physical ground current return path.

Figure 21:
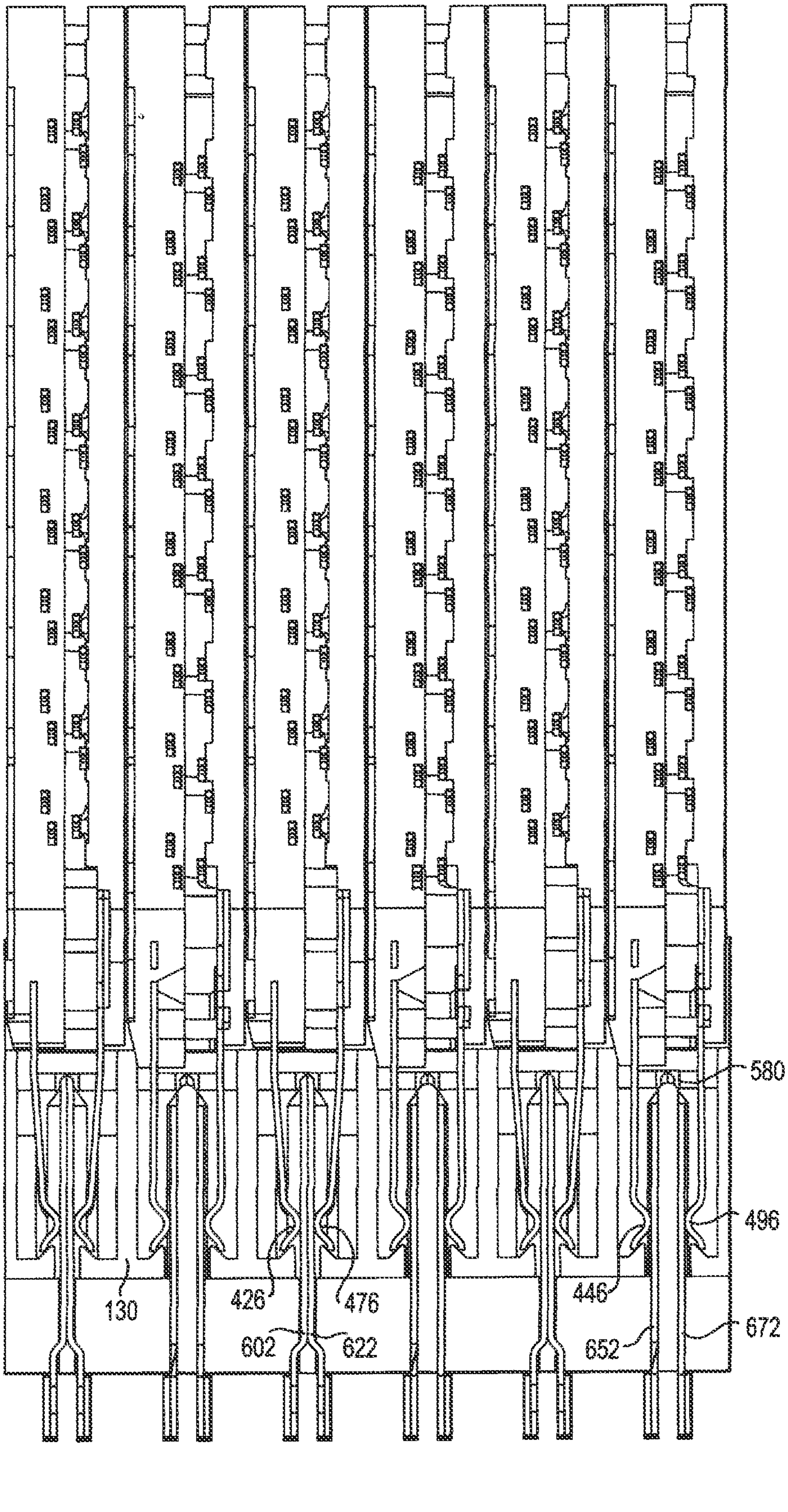

FIG. 21 shows the various wafers 122 connected with the blades in the shroud 158. The conductor contacts 426, 476, 446, 496 slidably engage the blades and have a pre-load force provided by the lip 134 of the front housing 130, as described above with respect to the first preferred embodiment. This illustration is taken along lines AA-AA of FIG. 18, showing the six columns of blades. The ground blades and signal blades are offset from one column to the next, so that they alternate along the rows, from a ground blade to a signal blade to a ground blade and so on.

Figure 22:
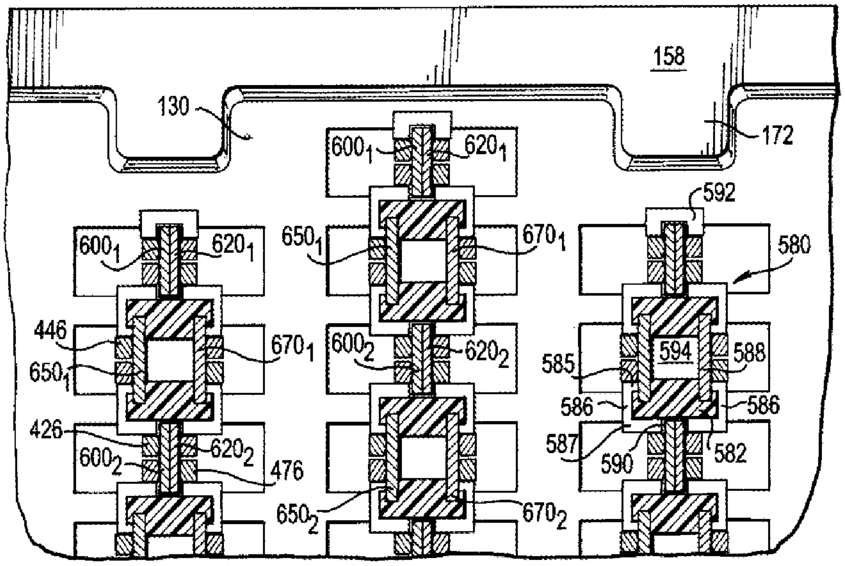

As shown in FIG. 22, the columns are staggered with respect to the neighboring column, so that the ground blades alternate with the signal blades across the rows. In this way, the first row has two ground blades $\mathbf{600}_1$, $\mathbf{620}_1$ from the second column, the second row has two ground blades $\mathbf{600}_1$, $\mathbf{620}_1$ from the first column, then two signal blades $\mathbf{650}_1$, $\mathbf{670}_1$ from the second column, and two ground blades $\mathbf{600}_1$, $\mathbf{620}_1$ from the third column, and so on. The third row has two signal blades $\mathbf{650}_1$, $\mathbf{670}_1$ from the first column, then two ground blades $\mathbf{600}_2$, $\mathbf{620}_2$ from the second column, and two signal blades $\mathbf{650}_1$, $\mathbf{670}_1$ from the third column, and so on. This provides a checkerboard type pattern, where the signal blades are surrounded on all four sides by ground blades, to reduce crosstalk and improve electrical characteristics. This also increases the distance in the mating interface between the closest spaced differential signal pairs, which reduces crosstalk. In addition, the grounds are placed at the ends of each column to shield the outside of the column.

Figure 23:
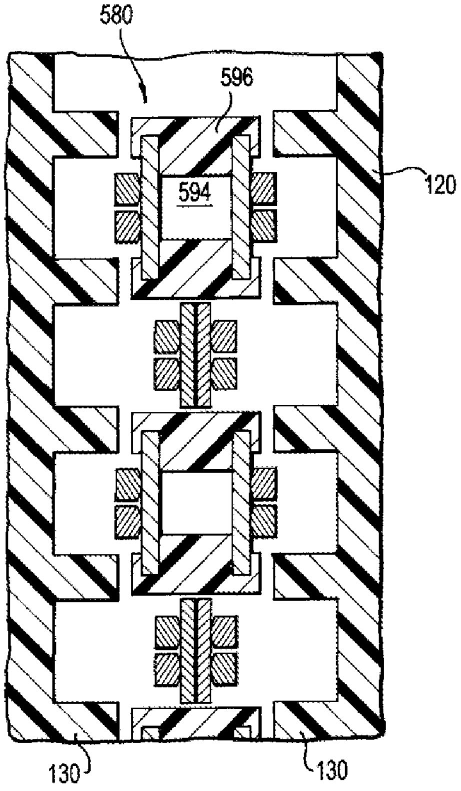

The details of the insulative post 580 are further shown in FIG. 23. The post 580 is an elongated, rectangular shape with one end which is fixed in the bottom of the shroud 158, and an opposite end which extends upright out of the bottom of the shroud 158 into the interior space of the shroud 158. The post 580 is formed by top and bottom (in the embodiment shown) support members 582 and C-shaped side members 586 having a short arm 585 and a long arm 587. The support member 582 forms an inner face or ledge 584. The side members 586 extend around the support members 582 to form a first gap 588 between the end of the short arm 585 and the ledge 584 and a second gap 590 where the ends of the long arms 587 come together. The first gap 588 receives the signal blades 650, 670, whereby the ledges 584 support the blades 650, 670 and prevent them from moving inward. And, the ends of the short arm 585 prevent the blades 650, 670 from falling forward or being bent.

The second gap 590 receives the ground blades 600, 620, whereby the ends of the long arms 587 prevent the blades 600, 620 from moving forward or backward, and particularly support the blades 600, 620 and prevent them from moving or bending as they are being mated with the respective ground contact points 426, 476. In this way, the ground blades 600, 620 are not freestanding, but supported by the post 580. A C-shaped end support member 592 is also provided at the end of each column. The end member 592 has a channel which receives the ground blades 600, 620 and supports the ground blades from moving or bending as they are mating with the ground contact points 426, 476. Thus, the signal blades 600, 620 are recessed from the side surfaces of the post 580, and the ground blades 650, 670 are recessed from the post 580 and the end members 592, for support and to prevent bending of the blades. The blades 600, 620, 650, 670 can inserted from the bottom of the shroud 158 and slidably received in the first and second gaps 588, 590.

The insulated posts 580 have an air space 594 in the middle so that the impedance of the mating interface can be tuned to a desired value. The mating interface often has lower than desired impedance due to the amount of metal for the conductors, blades and shielding. The air space 594 introduces a distance between the two signal contact pairs 446, 496. Air has a lower dielectric constant than a solid post and therefore acts to raise the impedance of the differential pair. It should be apparent that the posts 580 can take any suitable shape and configuration to retain the signal blades and/or the ground blades. For instance, the blades need not be recessed from the surface of the post 580 or end member 592. The triangular shapes represent the front housing 130 features which receive the blades. It is further noted that the posts 502 show in FIGS. 11, 13-15 can be configured to have an air space similar to that of FIGS. 22 and 23.

FIG. 23 shows that the posts 580 have support members 596 with a T-shape. The support members 596 form a ledge and a lip forming a channel which receives the signal blades, wherein the ledge and lip receive and support the signal blade and prevent the signal blade from moving inward to outward with respect to one another, or becoming bent, during mating with the daughter card connector 120. FIGS. 22 and 23 also show a cross section in the region of the mating interface for the connector halves. The daughtercard front housing 130, the backplane shroud 158 with guiding features 172 that slidingly engage with corresponding guiding features on front housing 130, as also shown in FIG. 1.

Accordingly, this second preferred embodiment of the present invention brings the two halves of each differential signal pair as close together as possible, but not too close to cause a low impedance, which results in a small signal loop between the pair that is self-shielding and doesn't talk to other pairs. It also provides a space between contacts in the first wafer, contacts in the second wafer (distance E in FIG. 8(*b*)) to allow routing on the signal layer and the printed circuit board.

The present invention provides a connector which has conductor wafer halves which are broadside coupled. The distance between the corresponding conductors of the wafer halves are controlled to provide improved impedance control and a high level of balance in the differential pairs. The lossy elements control crosstalk, reflection and radiation which can occur due to ground system resonances between separate ground conductors. The broadside coupled construction comprising approximately symmetrical pairs of lead frames reduces in-pair skew and maintains differential pair signal balance. The provision of physical ground conductors adjacent on either side to each lead frame on each signal conductor, provides closely spaced physical ground current return paths that reduce crosstalk and provide for controlled signal pair common (or even) mode impedance. All of this is achieved with manufacturable construction with a high degree of repeatability and low variability. Special features provide for enhanced routability of differential pairs that connect to the connector in the printed circuit board footprints, as well as efficient use of space for high density of interconnections.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A connector, comprising:

a plurality of insulative posts; and a plurality of signal blade pairs, each signal blade pair comprising two signal blades affixed to opposite sides of one of the insulative posts, the connector being configured to couple each of the signal blades to a signal conductor;

wherein each insulative post includes an air space, within the insulative post, between the two signal blades affixed to the insulative post.

2. The connector of claim 1, wherein the connector is configured to couple each signal blade pair affixed to each insulative post to a differential pair of signal conductors.

3. The connector of claim 1, wherein each insulative post comprises two T-shaped support members, each of the two T-shaped support members forming two ledges and two lips, the four ledges and four lips of each insulative post forming two channels on opposite sides of the insulative post between two of the ledges and two of the lips, each channel configured to receive and support one of two signal blades affixed to the insulative post.

4. The connector of claim 3, wherein each insulative post further comprises four C-shaped side members having a short arm and a long arm, each C-shaped side member wrapping around one side of one of the T-shaped support members such that the short arm of the C-shaped side member and the ledge of the T-shaped support member further form one of the channels configured to receive and support one of two signal blades affixed to the insulative post.

5. The connector of claim 1, wherein the plurality of insulative posts are arranged in rows, each row of insulative posts including a first row of signal blades and a second row of signal blades.

6. The connector of claim 5, further comprising at least one row of ground blades between each row of insulative posts.

7. The connector of claim 5, further comprising:

at least one row of ground blades between the first row of signal blades and a second row of signal blades of each row of insulative posts.

8. The connector of claim 5, wherein: each row of insulative posts is configured to couple to a wafer comprising:

a first plurality of conductors, including a first plurality of signal conductors and a first plurality of ground conductors, arranged substantially parallel to each other in a first plane;

a first insulative housing formed about a portion of the first plurality of conductors;

a second plurality of conductors, including a second plurality of signal conductors and a second plurality of ground conductors, arranged substantially parallel to each other in a second plane parallel to the first plane; and a second insulative housing formed about a portion of the second plurality of conductors to affix the second plurality of conductors to the first insulative housing; and the connector is configured to couple the signal blades of each insulative post to a signal conductor of the first plurality of signal conductors and a signal conductor of the second plurality of signal conductors.

9. The connector of claim 1, wherein the connector is a cable-to-board connector.

10. The connector of claim 1, wherein the connector is a board-to-cable connector.

11. A method of making a connector, the method comprising:

forming a plurality of insulative posts; and affixing two signal blades to opposite sides of each of the insulative posts;

wherein each insulative post includes an air space, within the insulative post, between the two signal blades affixed to the insulative post.

12. The method of claim 11, wherein the connector is configured to couple the two signal blades affixed to each insulative post to a differential pair of signal conductors.

13. The method of claim 11, wherein:

forming each insulative post comprises providing two T-shaped support members, each of the two T-shaped support members forming two ledges and two lips, the four ledges and four lips of each insulative post forming two channels on opposite sides of the insulative post between two of the ledges and two of the lips; and affixing the two signal blades to each insulative post comprises inserting the two signal blades into each of the two channels.

14. The method of claim 13, further comprising:

attaching a C-shaped side member, having a short arm and a long arm, around each side of each T-shaped support members such that the short arm of the C-shaped side member 586 and the ledge of the T-shaped support member form one of the channels configured to receive and support one of two signal blades affixed to the insulative posts.

15. The method of claim 13, wherein the plurality of insulative posts are arranged in rows, each row of insulative posts including a first row of signal blades and a second row of signal blades.

16. The method of claim 15, further comprising at least one row of ground blades between each row of insulative posts.

17. The method of claim 15, further comprising:

at least one row of ground blades between the first row of signal blades and a second row of signal blades of each row of insulative posts.

18. The method of claim 15, wherein: each row of insulative posts is configured to couple to a wafer comprising:

a first plurality of conductors, including a first plurality of signal conductors and a first plurality of ground conductors, arranged substantially parallel to each other in a first plane;

a first insulative housing formed about a portion of the first plurality of conductors;

a second plurality of conductors, including a second plurality of signal conductors and a second plurality of ground conductors, arranged substantially parallel to each other in a second plane parallel to the first plane; and a second insulative housing formed about a portion of the second plurality of conductors to affix the second plurality of conductors to the first insulative housing; and the connector is configured to couple the signal blades of each insulative post to a signal conductor of the first plurality of signal conductors and a signal conductor of the second plurality of signal conductors.

19. The method of claim 11, wherein the connector is a cable-to-board connector.

20. The method of claim 11, wherein the connector is a board-to-cable connector.

* * * * *